US012614254B2

(12) United States Patent
Lee et al.

(10) Patent No.: US 12,614,254 B2
(45) Date of Patent: Apr. 28, 2026

(54) ELECTRONIC DEVICE PERFORMING INTERPOLATION, OPERATION METHOD, AND STORAGE MEDIUM

(71) Applicants:Samsung Electronics Co., Ltd., Suwon-si (KR); UIF (University Industry Foundation), Yonsei University, Seoul (KR)

(72) Inventors: Jiyoun Lee, Suwon-si (KR); Sangyoun Lee, Seoul (KR); Sangjin Lee, Seoul (KR); Hyeongmin Lee, Seoul (KR); Hanbin Son, Seoul (KR); Chajin Shin, Seoul (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 327 days.

(21) Appl. No.: 18/455,140

(22) Filed: Aug. 24, 2023

(65) Prior Publication Data

US 2024/0070820 A1     Feb. 29, 2024

Related U.S. Application Data

(63) Continuation of application No. PCT/KR2023/012595, filed on Aug. 24, 2023.

(30) Foreign Application Priority Data

Aug. 24, 2022    (KR) ........................ 10-2022-0106093
Sep. 21, 2022    (KR) ........................ 10-2022-0119125

(51) Int. Cl.
G06T 5/50     (2006.01)
G06T 3/4007   (2024.01)
G06T 7/246    (2017.01)

(52) U.S. Cl.
CPC ................ G06T 5/50 (2013.01); G06T 7/246 (2017.01); *G06T 2207/10016* (2013.01);
(Continued)

(58) Field of Classification Search
CPC . G06T 5/50; G06T 7/246; G06T 2207/10016; G06T 2207/20081;
(Continued)

(56) References Cited

U.S. PATENT DOCUMENTS

2006/0062433 A1 *   3/2006   Ikeda ........................ G06T 5/50
                                                                   382/107
2012/0127163 A1     5/2012   Kim et al.
(Continued)

FOREIGN PATENT DOCUMENTS

JP        2020-154732 A      9/2020
KR    10-2012-0055102 A      5/2012
(Continued)

OTHER PUBLICATIONS

International Search Report and written opinion Nov. 29, 2023, issued in International Application No. PCT/KR2023/012595.

*Primary Examiner* — Charlotte M Baker
*Assistant Examiner* — Dustin Bilodeau
(74) *Attorney, Agent, or Firm* — Jefferson IP Law, LLP

(57)     ABSTRACT

An electronic device is provided. The electronic device includes at least one processor and a memory. The memory may store at least one instruction that, when executed by the at least one processor, enables the electronic device to obtain a first image frame and a second image frame. The memory may store at least one instruction that, when executed by the at least one processor, enables the electronic device to identify a first interpolation-applied object and a first interpolation non-applied object among objects included in the first image frame and identify a second interpolation-applied object and a second interpolation non-applied object among objects included in the second image frame.

18 Claims, 16 Drawing Sheets

(52) U.S. Cl.
CPC .............. *G06T 2207/20081* (2013.01); *G06T 2207/20084* (2013.01); *G06T 2207/20212* (2013.01)

(58) Field of Classification Search
CPC . G06T 2207/20084; G06T 2207/20212; G06T 3/4007; G06T 3/4046; G06T 2207/20182; G06T 5/60; G06T 5/70
USPC ........................................................ 382/107
See application file for complete search history.

(56) References Cited

U.S. PATENT DOCUMENTS

| | | | |
|---|---|---|---|
| 2018/0227487 A1 | 8/2018 | Heo et al. | |
| 2020/0013371 A1 | 1/2020 | Yang et al. | |
| 2020/0327702 A1* | 10/2020 | Wang ................... | H04N 19/102 |
| 2020/0342634 A1 | 10/2020 | Barnes et al. | |
| 2021/0327027 A1 | 10/2021 | Cho et al. | |
| 2022/0103782 A1* | 3/2022 | Li ........................... | G06N 3/045 |
| 2023/0209087 A1 | 6/2023 | Baijal et al. | |

FOREIGN PATENT DOCUMENTS

| | | |
|---|---|---|
| KR | 10-1834952 B1 | 3/2018 |
| KR | 10-2018-0091359 A | 8/2018 |
| KR | 10-2019-0100097 A | 8/2019 |
| KR | 10-2201297 B1 | 1/2021 |
| KR | 10-2207736 B1 | 1/2021 |
| KR | 10-2021-0020387 A | 2/2021 |
| KR | 10-2242334 B1 | 4/2021 |
| KR | 10-2022-0026426 A | 3/2022 |

* cited by examiner

1

ELECTRONIC DEVICE PERFORMING INTERPOLATION, OPERATION METHOD, AND STORAGE MEDIUM

CROSS-REFERENCE TO RELATED APPLICATION(S)

This application is a continuation application, claiming priority under § 365(c), of an International application No. PCT/KR2023/012595, filed on Aug. 24, 2023, which is based on and claims the benefit of a Korean patent application number 10-2022-0106093, filed on Aug. 24, 2022, in the Korean Intellectual Property Office, and of a Korean patent application number 10-2022-0119125, filed on Sep. 21, 2022, in the Korean Intellectual Property Office, the disclosure of each of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) UIF (University Industry Foundation), Yonsei University.

TECHNICAL FIELD

The disclosure relates to an electronic device performing interpolation, an operation method, and a storage medium.

BACKGROUND ART

Recently, deep learning-based research in various fields is being actively conducted in relation to video quality enhancement. Among such techniques, video frame interpolation may be aimed at enhancing the temporal-quality of video. An interpolation technique may be based on to provide a high-temporal-frequency video by using a low-temporal-frequency video or a slow video maintaining the temporal frequency. It may be possible to enhance the time domain quality of video based on interpolation even without enhancing hardware performance. For example, interpolation may generate intermediate image frames by predicting pixel motion. For example, interpolation may estimate the motion of at least one object included in two input image frames to generate an intermediate image frame based on the estimation result.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device performing interpolation, an operation method, and a storage medium.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor and a memory. The memory may store at least one instruction that, when executed by the at least one processor, enables the electronic device to obtain a first image frame and a second image frame. The memory may store at least one instruction that, when executed by the at least one processor, enables the electronic device to identify a first interpolation-applied object and a first interpolation non-applied object among objects included in the first image frame and identify a second interpolation-applied object and a second interpolation non-applied object among objects included in the second image frame. Here, the first interpolation-applied object and the second interpolation-applied object may be objects having a gradually continuous movement in the first image frame and the second image frame. Here, the first interpolation non-applied object and the second interpolation non-applied object may be objects having no gradually continuous movement in the first image frame and the second image frame. The memory may store at least one instruction that, when executed by the at least one processor, enables the electronic device to provide an interpolation image frame including a result of interpolation on the first interpolation-applied object and the second interpolation-applied object and the first interpolation non-applied object or the second interpolation non-applied object.

According to an embodiment of the disclosure, in a storage medium storing at least one computer-readable instruction, the at least one instruction, when executed by at least one processor of an electronic device, may enable the electronic device to perform at least one operation. The at least one operation includes obtaining a first image frame and a second image frame. The at least one operation includes identifying a first interpolation-applied object and a first interpolation non-applied object among objects included in the first image frame and identifying a second interpolation-applied object and a second interpolation non-applied object among objects included in the second image frame. Here, the first interpolation-applied object and the second interpolation-applied object may be objects having a gradually continuous movement in the first image frame and the second image frame. Here, the first interpolation non-applied object and the second interpolation non-applied object may be objects having no gradually continuous movement in the first image frame and the second image frame. The at least one operation includes providing an interpolation image frame including a result of interpolation on the first interpolation-applied object and the second interpolation-applied object and the first interpolation non-applied object or the second interpolation non-applied object.

In accordance with another aspect of the disclosure, a method for operating an electronic device is provided. The method includes obtaining a first image frame and a second image frame. The method for operating the electronic device includes identifying a first interpolation-applied object and a first interpolation non-applied object among objects included in the first image frame and identifying a second interpolation-applied object and a second interpolation non-applied object among objects included in the second image frame. Here, the first interpolation-applied object and the second interpolation-applied object may be objects having a gradually continuous movement in the first image frame and the second image frame. Here, the first interpolation non-applied object and the second interpolation non-applied object may be objects having no gradually continuous movement in the first image frame and the second image frame. The method for operating the electronic device includes providing an interpolation image frame including a result of interpolation on the first interpolation-applied object and the second interpolation-applied object and the first interpolation non-applied object or the second interpolation non-applied object.

In accordance with another aspect of the disclosure, an electronic device is provided. The electronic device at least one processor and a memory. The memory may store at least one instruction that, when executed by the at least one processor, enables the electronic device to input a plurality of image frames to a first artificial intelligence (AI) model and obtain a discontinuous map as an output from the first AI model. The memory may store at least one instruction that, when executed by the at least one processor, enables the electronic device to input a first image frame and a second image frame among the plurality of image frames to a second AI model for interpolation and obtain an interpolation image frame as an output from the second AI model. The memory may store at least one instruction that, when executed by the at least one processor, enables the electronic device to provide a final interpolation image frame for the first image frame and the second image frame, based on a weighted sum of a reference image frame selected from the first image frame and the second image frame, the interpolation image frame, and the discontinuous map.

According to an embodiment of the disclosure, in a storage medium storing at least one computer-readable instruction, the at least one instruction, when executed by at least one processor of an electronic device, may enable the electronic device to perform at least one operation. The at least one operation includes inputting a plurality of image frames to a first AI model and obtaining a discontinuous map as an output from the first AI model. The at least one operation includes inputting a first image frame and a second image frame among the plurality of image frames to a second AI model for interpolation and obtaining an interpolation image frame as an output from the second AI model. The at least one operation includes providing a final interpolation image frame for the first image frame and the second image frame, based on a weighted sum of a reference image frame selected from the first image frame and the second image frame, the interpolation image frame, and the discontinuous map.

In accordance with another aspect of the disclosure, a method for operating an electronic device is provided. The method includes inputting a plurality of image frames to a first AI model and obtaining a discontinuous map as an output from the first AI model. The method for operating the electronic device includes inputting a first image frame and a second image frame among the plurality of image frames to a second AI model for interpolation and obtaining an interpolation image frame as an output from the second AI model. The method for operating the electronic device includes providing a final interpolation image frame for the first image frame and the second image frame, based on a weighted sum of a reference image frame selected from the first image frame and the second image frame, the interpolation image frame, and the discontinuous map.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
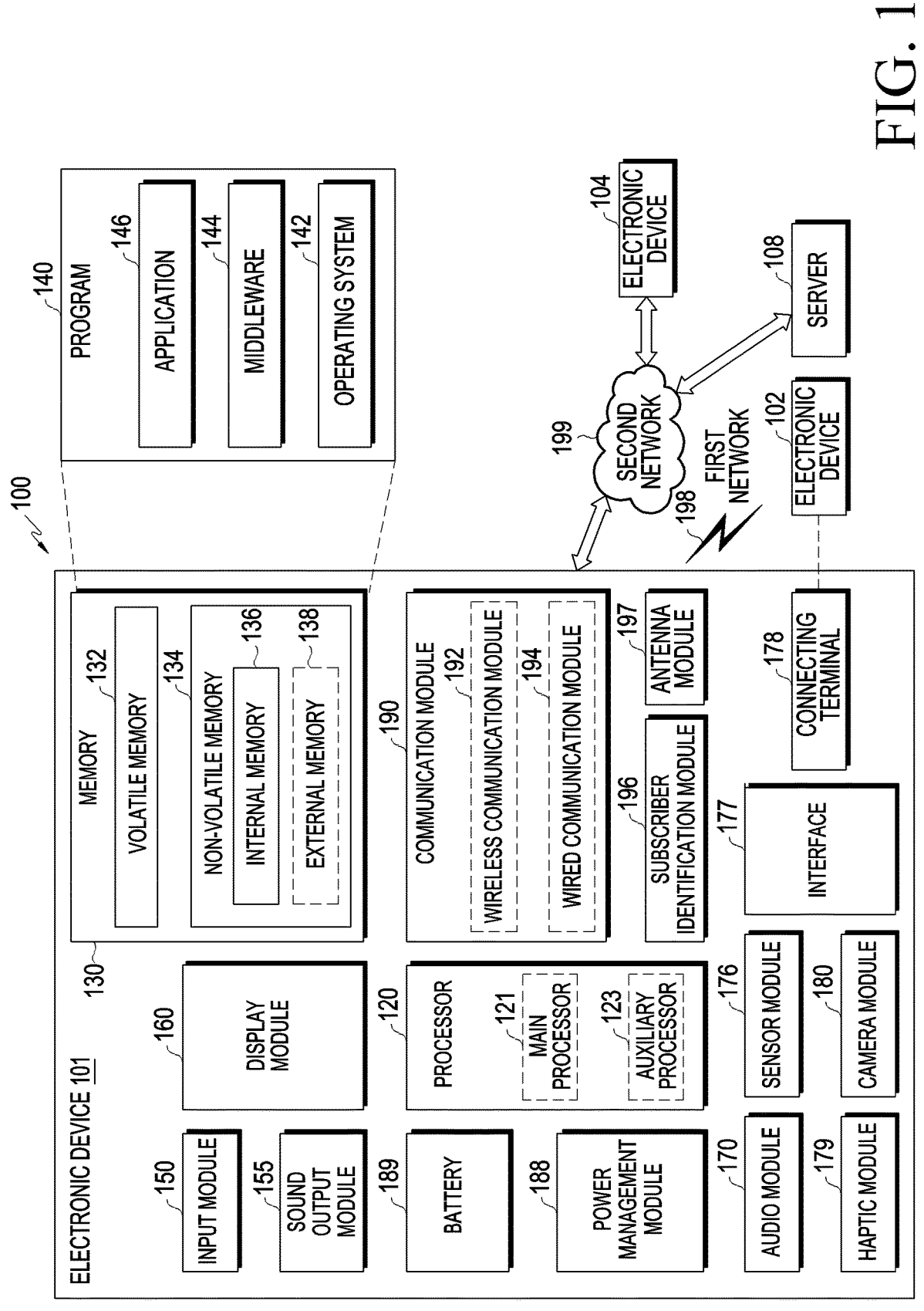
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductive body or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
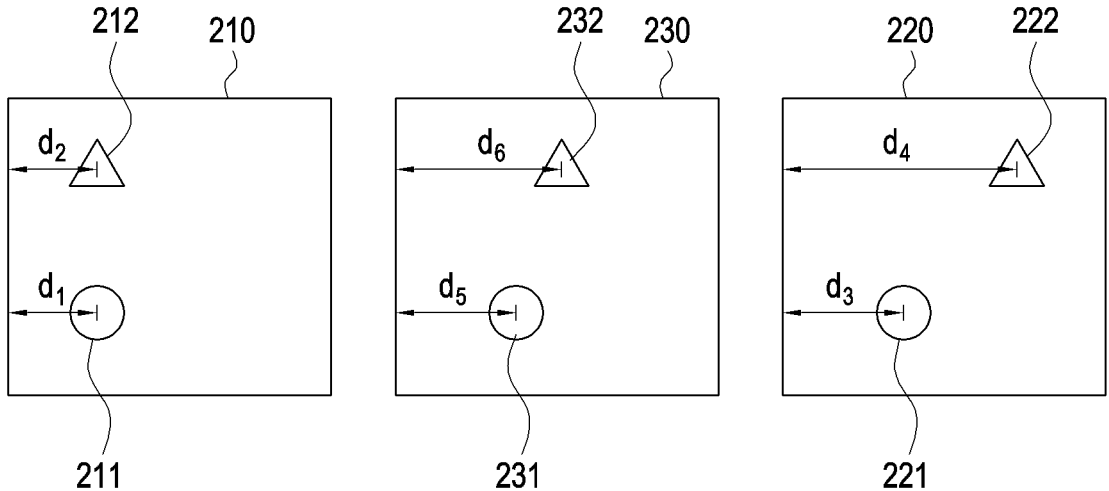
FIG. 2 is a view illustrating interpolation according to an embodiment of the disclosure.

FIG. 2 is a view illustrating interpolation according to an embodiment of the disclosure.

Referring to FIG. 2, according to an embodiment of the disclosure, an electronic device 101 (e.g., the processor 120) may obtain (or receive) a first image frame 210 and a second image frame 220. For example, the electronic device 101 may obtain the first image frame 210 and the second image frame 220 by capturing them at a first frame rate. Meanwhile, it will be appreciated by one of ordinary skill in the art that obtaining the image frames is merely an example, and the electronic device 101 may load image frames 210 and 220, which are pre-captured and stored, for interpolation purposes, or obtain a video file including the image frames 210 and 220 (e.g., receive the image frames from another electronic device based on a wired or wireless interface), and obtaining the image frames 210 and 220 is not limited to a specific method.

According to an embodiment of the disclosure, the electronic device 101 may generate an interpolation image frame 230 by performing interpolation. The interpolation image frame 230 may be an image frame corresponding to an intermediate time between the first image frame 210 and the second image frame 220 in time series. The electronic device 101 may perform video playback at a second frame rate higher than the first frame rate, using the first image frame 210, the interpolation image frame 230, and the second image frame 220. Or, the electronic device 101 may play slow video playback at the first frame rate (or may be another frame rate, but is not limited) using the first image frame 210, the interpolation image frame 230, and the second image frame 220, and use of the interpolation image frame 230 is not limited. For example, the first image frame 210 may include a first object 211 and a second object 212. The second image frame 220 may include a third object 221 and a fourth object 222.

For example, the second object 212 and the fourth object 222 may correspond to each other. For example, the second object 212 and the fourth object 222 in the video frame may be captured results of the same subject and, for convenience of description, may be referred to as interpolation-applied objects. Meanwhile, it will be appreciated by one of ordinary skill in the art that object is merely a concept, and the electronic device 101 may determine whether each area (e.g., pixel range) in the image frame is an interpolation-applied area, and object and area may be interchangeably used. Meanwhile, it will be appreciated by one of ordinary skill in the art that the second object 212 and the fourth object 222 being the results captured for the subject is merely an example, and objects are not limited as long as they are objects having continuous movement in the video frame and/or disposed in the same position, and may also be implemented as graphic elements (e.g., computer graphic elements but not limited) having continuous movement, as artificially created, as well as the actual captured results. For example, although objects correspond to each other, the objects may have different shapes and/or positions. For example, when objects corresponding to each other are results captured for the same subject, the shapes and/or positions of the objects corresponding to each other may differ based on various change factors, such as the movement of the subject over time, change in the distance from the subject to the camera module, and change in the camera capturing composition. For example, it is assumed that the second object 212 of the first image frame 210 is d2 away from one side of the first image frame 210, and the fourth object 222 of the second image frame 220 is d4 away from one side of the second image frame 220. This may be attributed to a movement (subject movement and/or camera movement) in the field of view (FOV) of the subjects (or graphic elements) corresponding to the second object 212 and the fourth object 222. As described above, interpolation for the interpolation-applied object (e.g., the second object 212 and the fourth object 222) may be preferably performed based on the movement estimated for, e.g., the second object 212 and the fourth object 222. For example, an interpolation object 232 corresponding to the second object 212 and the fourth object 222 may be included in the interpolation image frame 230. The interpolation object 232 may be generated based on, e.g., the movement estimated for the second object 212 and the fourth object 222 and/or the position of the second object 212 and the fourth object 222. It may be identified that the interpolation object 232 is d6 away from one side of the interpolation image frame 230. The distance d6 may be determined based on the movement estimated for the second object 212 and the fourth object 222 and/or the positions of the second object 212 and the fourth object 222. Meanwhile, it will be appreciated by one of ordinary skill in the art that the image frames used in various embodiments are not limited, such as image frames for video playback, such as animation, rather than live-action image frames, image frames for game screen playback, and image frames for any application (e.g., chat application), as long as the image frames may be displayed on the display module 160 of the electronic device 101.

For example, the first object 211 and the third object 221 may correspond to each other. For example, the first object 211 and the third object 221 in the video frame may be not the above-described objects having continuous movement but objects that have discontinuous movement and/or remain displayed substantially in the same area and, for convenience of description, be referred to as interpolation non-applied objects. As described above, it will be appreciated by one of ordinary skill in the art that interpolation non-applied object is interchangeably used with interpolation non-applied area. For example, the interpolation non-applied object remaining displayed in substantially the same area may include text (e.g., text for subtitle and/or text for indicating application information (e.g., game-related information), but limited limited) covering at least a portion of the default screen (e.g., 210, 220, or 230), an object for user manipulation, and/or an object for recognizing user information, but is not limited in type. Here, that the object covers at least a portion of the default screen may mean that at least a portion of the default screen is not displayed by the object, and this may be implemented to allow the object to be displayed in a layer defined on the default screen and/or to replace at least a portion of the default screen, and it will be appreciated by one of ordinary skill in the art that the implementation method is not limited. As described above, the interpolation non-applied object is text and/or an object covering the default screen and may include a shape corresponding to the text and/or a shape of an artificial figure (e.g., circle or rectangle, but not limited). The video content may also be displayed to allow an object, figure, and/or text having discontinuous movement to cover the screen based on various streaming service schemes. Or, various interfaces (e.g., chatting window, text, control object, or button, but not limited) covering the screen may also be provided on the game or augmented reality (AR) content. The artificial intelligence model for dividing interpolation non-applied objects (or interpolation non-applied areas) may be trained based on a training data set based on images including shapes of artificial figures and/or the shape corresponding to the above-described text, and this is described below. Meanwhile, the discontinuous movement may mean, e.g., a movement to which a change in position and/or shape between image frames exceeds a threshold, and/or a movement to which a change occurs within a relatively short time (e.g., in a relatively small number of image frames) occurs, but is not limited. For example, when the video frame is an execution screen of a message application, at the time when a specific reception message is displayed or transmission message is displayed, for existing displayed messages, objects may be moved within a relatively short time, and messages for which an object is moved within a relatively short time may be examples of interpolation non-applied objects.

The interpolation non-applied objects (e.g., the first object 211 and the third object 221) may need to remain displayed in substantially the same position or require a discontinuous movement to be represented within a short time. Meanwhile, if interpolation is performed on the first object 211 and the third object 221, an interpolation object 231 may be created. It may be identified that the interpolation object 231 is d5 away from one side of the interpolation image frame 230. The distance d5 may be determined based on the movement estimated for the first object 211 and the third object 221 and/or the positions of the first object 211 and the third object 221. However, when the interpolation object 231 is disposed in an intermediate position between the first object 211 and the third object 221, the characteristics of the interpolation non-applied object may be improperly expressed.

Figure 3A:
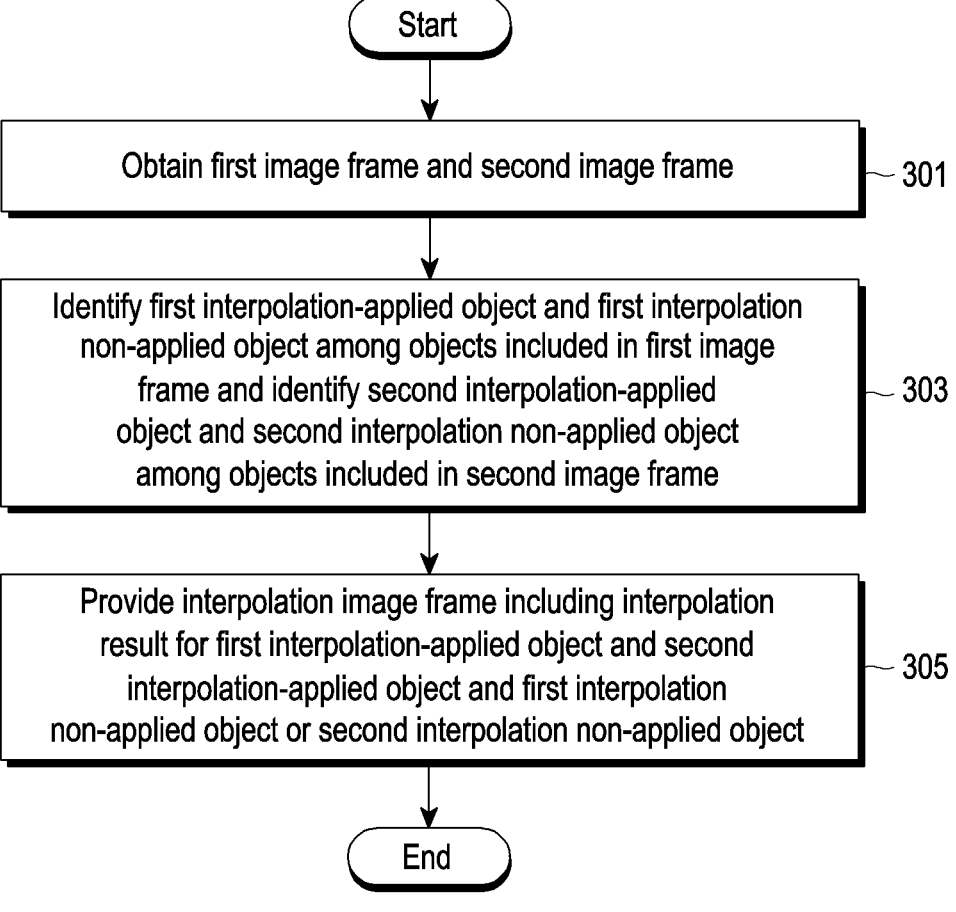
FIG. 3A is a flowchart illustrating an operation method of an electronic device according to an embodiment of the disclosure.
Figure 3B:
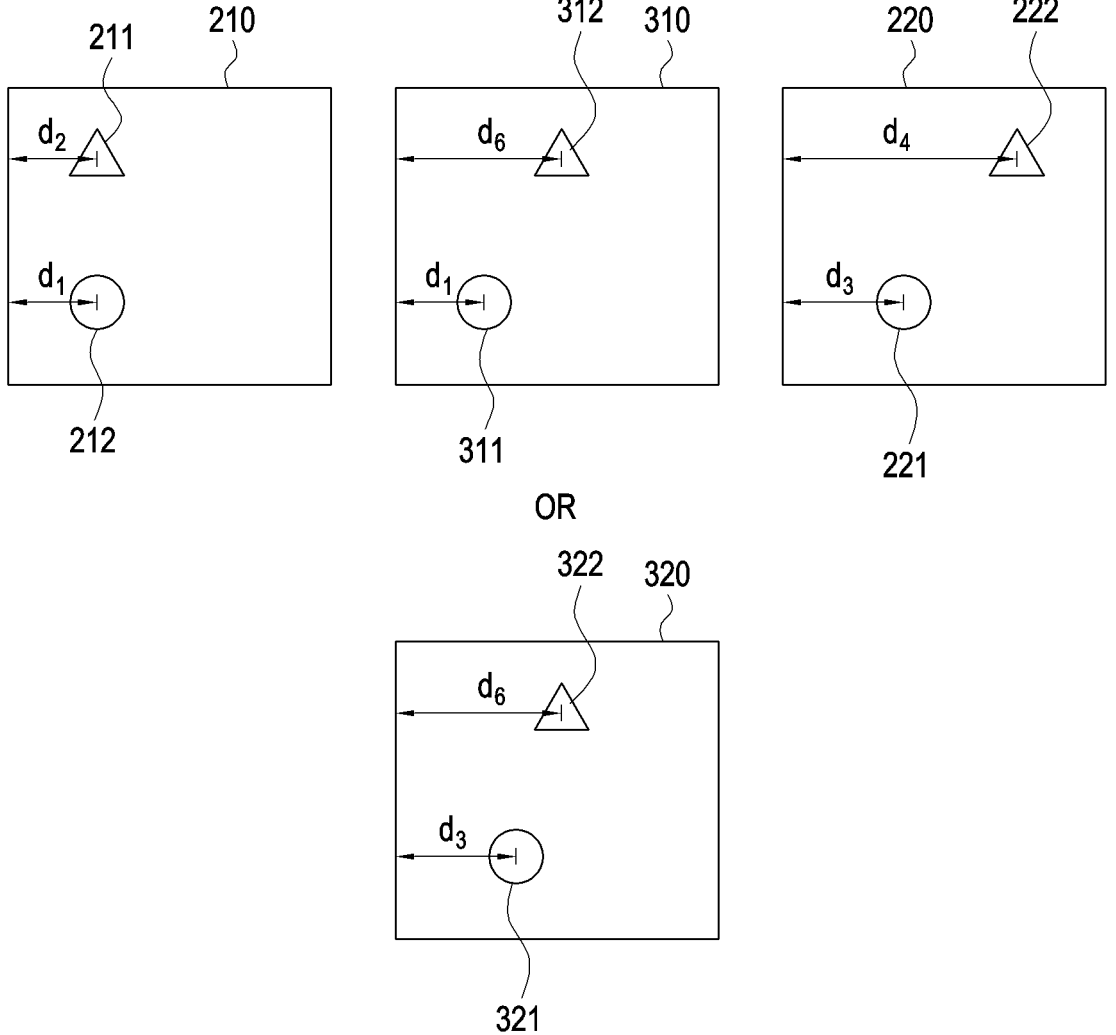
FIG. 3B is a view illustrating an operation of generating an interpolation image according to an embodiment of the disclosure.

FIG. 3A is a flowchart illustrating an operation method of an electronic device according to an embodiment of the disclosure. The embodiment of FIG. 3A is described with reference to FIG. 3B. FIG. 3B is a view illustrating an operation of generating an interpolation image according to an embodiment of the disclosure.

Referring to FIGS. 3A and 3B, according to an embodiment of the disclosure, an electronic device 101 (e.g., the processor 120 of FIG. 1) may obtain (or receive) a first image frame 210 and a second image frame 220 in operation 301. The first image frame 210 may include a first object 211 and a second object 212. The second image frame 220 may include a third object 221 and a fourth object 222. For example, the first object 211 may correspond to the third object 221 and the second object 212 may correspond to the fourth object 222. Based on the first image frame 210 and the second image frame 220, the electronic device 101 may detect an event for performing interpolation and/or identify satisfaction of an interpolation performance condition. For example, the event for performing interpolation may include an event for providing a high frame rate (FR) and/or an event for providing a slow video, but is not limited thereto. For example, conditions for performing interpolation may include, but are not limited to, conditions in which a temperature margin exceeds a threshold and/or a resource margin exceeds a threshold. Meanwhile, it will be appreciated by one of ordinary skill in the art that the operation of detecting the event for performing interpolation and/or identifying whether the interpolation performance condition is met may be omitted.

According to an embodiment of the disclosure, in operation 303, the electronic device 101 may identify a first interpolation-applied object (e.g., the second object 212) and a first interpolation non-applied object (e.g., the first object 211) among the objects included in the first image frame 210 and identify a second interpolation-applied object (e.g., the fourth object 222) and a second interpolation non-applied object (e.g., the third object 221) among the objects included in the second image frame 220. For example, the electronic device 101 may divide the interpolation non-applied objects (e.g., the first object 211 and the third object 221) and the interpolation-applied objects (e.g., the second object 212 and the fourth object 222). For example, the electronic device 101 may divide the interpolation non-applied objects and the interpolation-applied objects using an artificial intelligence model for dividing interpolation non-applied objects and interpolation-applied objects, but is not limited. As described above, the interpolation non-applied object is text and/or an object covering the default screen and may include a shape corresponding to the text and/or a shape of an artificial figure (e.g., circle or rectangle, but not limited). The artificial intelligence model may be trained based on the training data set based on the image in which the shape corresponding to text and/or the shape of an artificial figure covers the background screen. Accordingly, the artificial intelligence model may be trained to detect the interpolation non-applied object. For example, the artificial intelligence model may also be trained based on the training data set based on based on the image including the object having the characteristic of discontinuous movement. For example, the image of the training data set may be an execution screen of the messenger application, and a message window (or message object) which is an object discontinuously moving on the execution screen may be set as the interpolation non-applied object. According to what is described above, the artificial intelligence model may be trained to identify the interpolation non-applied object. The artificial intelligence model may receive, e.g., a plurality of image frames (e.g., three or more but not limited thereto) as an input, and provide an image frame (which may be referred to as, e.g., a "discontinuous map") in which the interpolation non-applied object and the interpolation-applied object are divided, but is not limited. For example, a first value (e.g., 0) may be assigned to the pixel included in the interpolation-applied area of the discontinuous map, and a second value (e.g., 1) may be assigned to the pixel included in the interpolation non-applied area. Or, a real number between the first value (e.g., 0) and the second value (e.g., 1) may be assigned to each pixel of the discontinuous map. As the pixel value gets closer to the first value (e.g., 0), it is more likely to indicate an interpolation-applied object and, as the pixel value gets closer to the second value (e.g., 1), it is more likely to indicate an interpolation non-applied object, but the implementation form is not limited thereto. Meanwhile, dividing interpolation-applied objects and interpolation non-applied objects using the artificial intelligence model is an example. The electronic device 101 may divide interpolation-applied objects and interpolation non-applied objects based on, e.g., image recognition results for any one image frame among a plurality of image frames, and it will be appreciated by one of ordinary skill in the art that the dividing method is not limited.

According to an embodiment of the disclosure, in operation 305, the electronic device 101 may provide a result for interpolation for the first interpolation-applied object (e.g., the second object 212) and the second interpolation-applied object (e.g., the fourth object 214) and an interpolation image frame 310 or 320 including the first interpolation non-applied object (e.g., the first object 211) or the second interpolation non-applied object (e.g., the third object 221). For example, the electronic device 101 may perform interpolation on the first interpolation-applied object (e.g., the second object 212) and the second interpolation-applied object (e.g., the fourth object 214) and may thus identify an interpolation object 312 according to the performed result. Meanwhile, the electronic device 101 may not perform interpolation on the interpolation non-applied objects (e.g., the first object 211 and the third object 221), but select any one of both the objects, and criteria for selection are not limited. For example, the electronic device 101 may select the first image frame 210, which is a preceding image frame, as a reference image frame. In this case, the electronic device 101 may provide an interpolation image frame 310 including a same object 311 as the first object 211 which is the interpolation non-applied object of the first image frame 210 which is the preceding image frame and the object 312 which is the interpolation result for the interpolation-applied objects 212 and 222. It may be identified that the object 311 is d1 away from one end of the interpolation image frame 310, and the object 311 may be identical to the first object 211. For example, the electronic device 101 may select the second image frame 220, which is a following image frame, as a reference image frame. In this case, the electronic device 101 may provide an interpolation image frame 320 including the same object 321 as the third object 221 which is the interpolation non-applied object of the second image frame 220 which is the following image frame and an object 322 which is the interpolation result for the interpolation-applied objects 212 and 222. It may be identified that the object 321 is d3 away from one end of the interpolation image frame 321, and the object 321 may be identical to the third object 221. According to what is described above, part of the preceding image or part of the following image may be reflected in the interpolation non-applied area of the interpolation image frame 310 or 320. Accordingly, such a phenomenon in which text, which is a kind of interpolation non-applied object, appears as if several pieces of text overlap may be prevented. Further, for the other areas (or interpolation-applied objects (or areas) than the interpolation non-applied objects (or areas), interpolation may be performed, so that high FR playback and keeping text or control objects displayed clearly based on the interpolation result may be possible.

Figure 4:
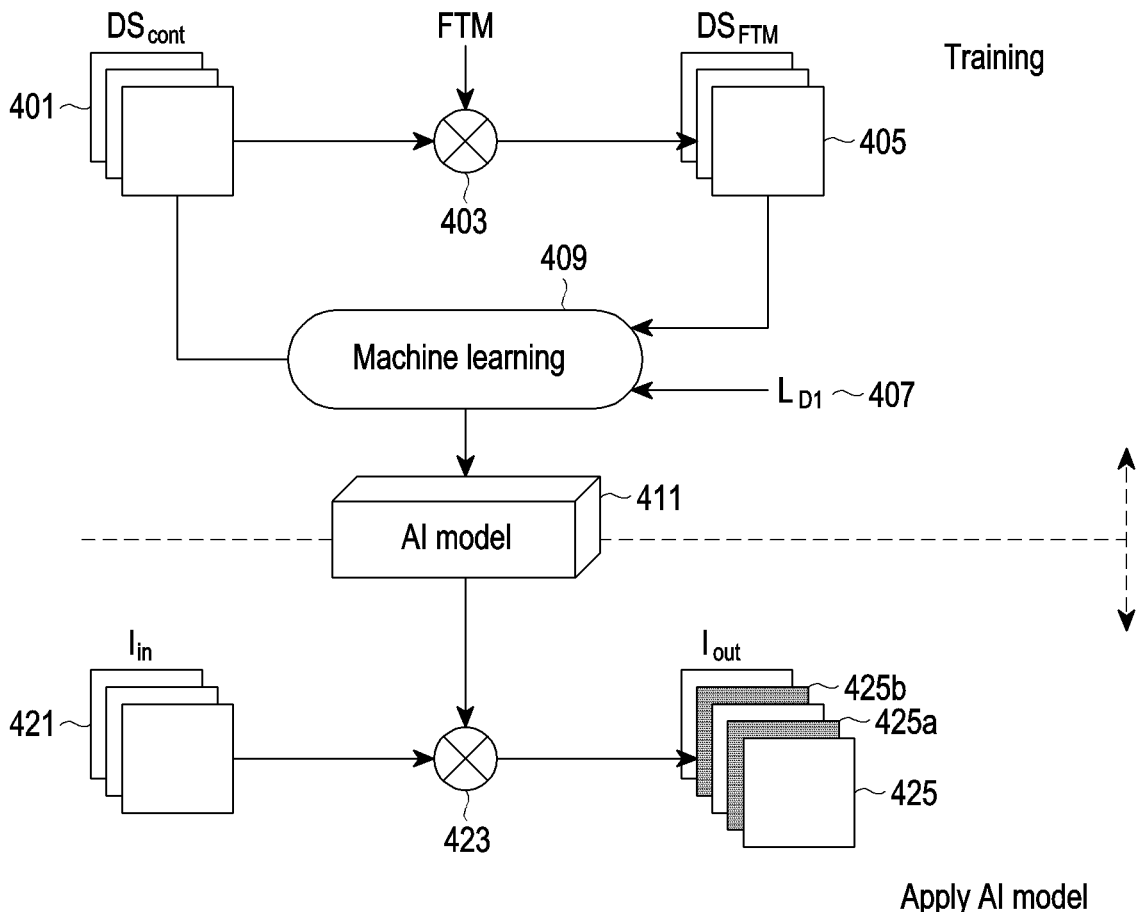
FIG. 4 is a view illustrating an artificial intelligence (AI) model training operation and an AI model use operation according to an embodiment of the disclosure.

FIG. 4 is a view illustrating an AI model training operation and an AI model use operation according to an embodiment of the disclosure.

Referring to FIG. 4, according to an embodiment of the disclosure, the electronic device 101 (e.g., the processor 120 of FIG. 1) or the external electronic device (e.g., the server 108 but not limited thereto) may obtain (or load) a training data set (DScont) 401 including continuous image frames. The training data set 401 including continuous image frames may include, e.g., at least one time-series image frames (e.g., image frames constituting a video frame). The electronic device 101 or external electronic device may perform figure and/or text mixing (FTM) 403 on each training data set 401 including continuous image frames, obtaining (or generating) a training data set 405 including frames including interpolation non-applied objects. The electronic device 101 or external electronic device may perform machine learning based on the training data set 401 and/or the training data set 405 which has undergone the FTM 403, so that a trained AI model 411 may be provided. In machine learning 409, a loss function ($L_{D1}$) 407 may be used. This is described below. Generation of the training data set 405 including frames including interpolation non-applied objects and/or training of the AI model 411 is described below.

The trained AI model 411 may be stored (or downloaded and stored) in the electronic device 101. The electronic device 101 may input an input image frames (Iin) 421 to the AI model 411. As the input image frames 421 are applied (423) to the AI model 411, output image frames (Iout) 425 may be provided from the AI model 411. For example, the AI model 411 may provide interpolation image frames 425a and 425b based on the input image frames 421. Accordingly, output image frames 425 including the input image frames 421 and the interpolation image frames 425*a* and 425*b* may be provided. Application to the AI model 411 is described below.

Figure 5A:
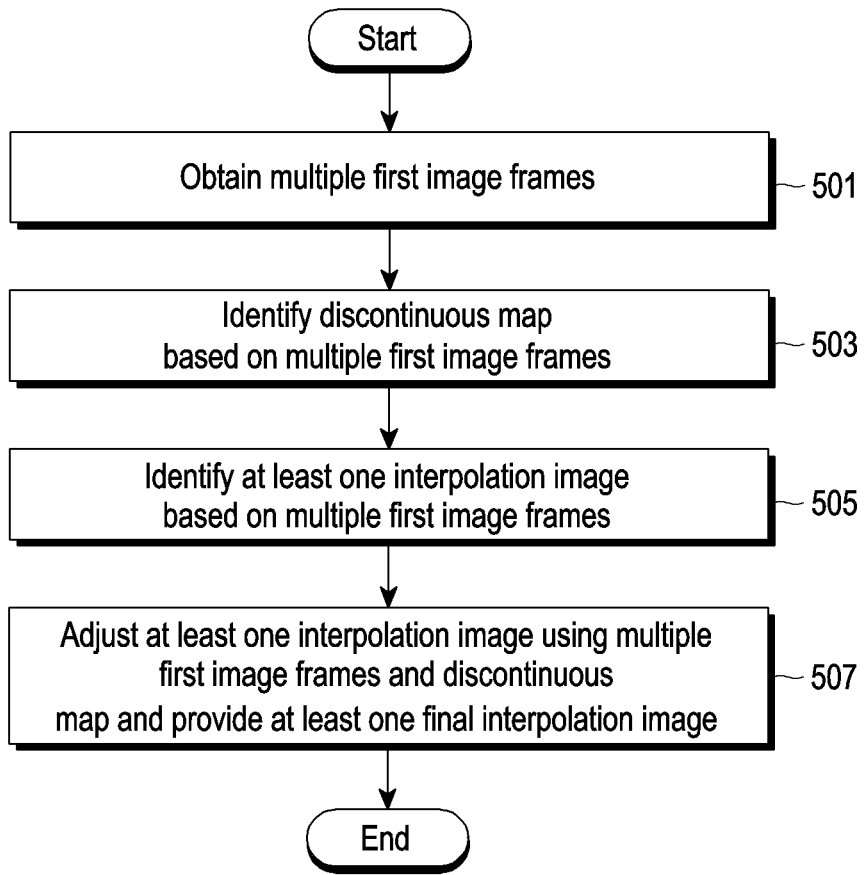
FIG. 5A is a flowchart illustrating an operation method of an electronic device according to an embodiment of the disclosure.
Figure 5B:
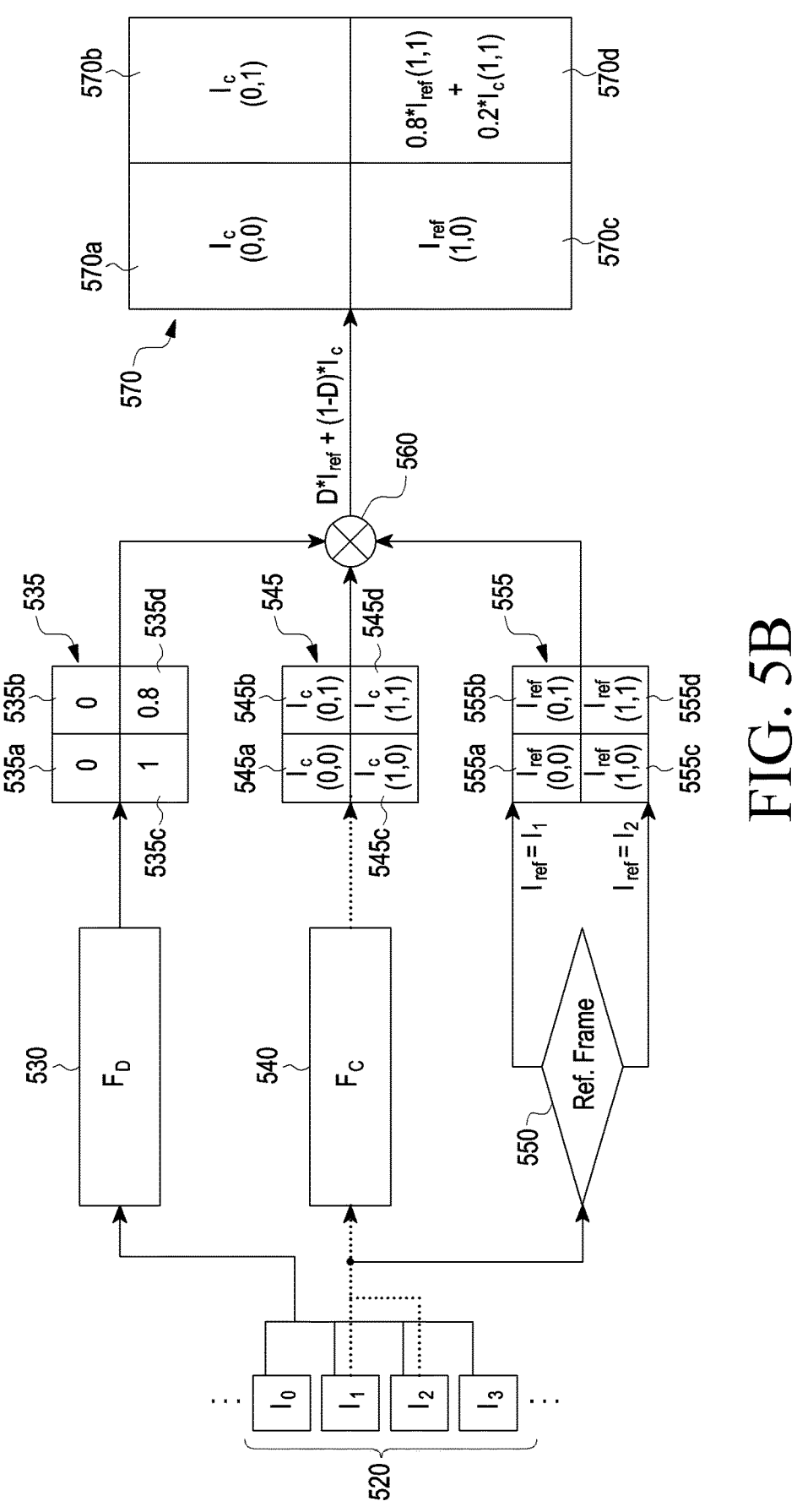
FIG. 5B is a view illustrating an interpolation image frame generation process using a discontinuous map according to an embodiment of the disclosure.

FIG. 5A is a flowchart illustrating an operation method of an electronic device according to an embodiment of the disclosure. The embodiment of FIG. 5A is described with reference to FIG. 5B. FIG. 5B is a view illustrating an interpolation image frame generation operation using a discontinuous map according to an embodiment of the disclosure.

Referring to FIGS. 5A and 5B, according to an embodiment of the disclosure, the electronic device 101 (e.g., the processor 120 of FIG. 1) may obtain a plurality of first image frames 520 in operation 501. As described above, the electronic device 101 may capture or receive image frames or may load stored image frames for interpolation purposes. The plurality of first image frames 520 may have notations of $I_0$, $I_1$, $I_2$, and $I_3$, respectively, which may mean, e.g., a time-series sequence, but is not limited. In operation 503, the electronic device 101 may identify a discontinuous map 535 based on the plurality of first image frames 520. As described above, it has been described that an AI model for identifying an interpolation non-applied object (or area) may be stored in the electronic device 101. It has also been described that there is no limitation on the format for representing the interpolation non-applied object (or area), and in one example, an image frame having values indicating whether it is an interpolation non-applied object (or area), for each pixel (or area) may be referred to as a discontinuous map 535. Accordingly, the AI model for identifying the interpolation non-applied object (or area) may have the same meaning as the AI model 530 for providing the discontinuous map 535, and this may be referred to as $F_D$ for convenience of description.

According to an embodiment of the disclosure, the discontinuous map 535 may include four areas 535*a*, 535*b*, 535*c*, and 535*d*. The division of the discontinuous map 535 into four areas 535*a*, 535*b*, 535*c*, and 535*d* is merely an example, and it will be appreciated by one of ordinary skill in the art that the number and/or shape of the divided areas is not limited, and the values constituting the discontinuous map 535 may be set per pixel, rather than per area. For example, the value of the first area 535*a* of the discontinuous map 535 may be "0", the value of the second area 535*b* of the discontinuous map 535 may be "0", the value of the third area 535*c* of the discontinuous map 535 may be "1", and the value of the fourth area 535*d* of the discontinuous map 535 may be "0.8". The closer to 0 the value of the area (or pixel) is, the more likely it is to be an interpolation applied object (or area). The closer to 1 the value of the area (or pixel) is, the more likely it is to be an interpolation non-applied object. Meanwhile, the discontinuous map 535 is implemented to have a real value between 0 and 1, as shown in FIG. 5B. In another embodiment of the disclosure, the value of the area (or pixel) of the discontinuous map 535 may be implemented to have a binary form of 0 or 1. Since the AI model 530 is trained based on the training data set including interpolation non-applied objects, the discontinuous map 535 may be output. Although FIG. 5B illustrates that the AI model 530 has a structure to receive four input image frames (e.g., the plurality of first image frames 520), and the number of input image frames is not limited. One discontinuous map 535 may be created for the input image frames, but is not limited. Meanwhile, as described above, the provision of the discontinuous map 535 based on the AI model 530 is merely an example, and it will be appreciated by one of ordinary skill in the art that interpolation non-applied objects may be identified even based on an algorithm other than the AI model 530.

Referring back to FIG. 5A, according to an embodiment of the disclosure, in operation 505, the electronic device 101 may identify at least one interpolation image (Ic) 545 based on a plurality of first image frames 520. For example, the electronic device 101 may input two input image pairs (e.g., $I_1$ and $I_2$ of FIG. 5B) to the AI model 540 for interpolation and identify an interpolation image 545 which is the output of the AI model 540. The AI model 540 is not limited as long as it is a model (or algorithm) capable of performing interpolation, and for example, Sepconv, BMBC, AdaCoF, and ABME may be used, but is not limited. Although not shown, it will be appreciated by one of ordinary skill in the art that three interpolation images may be generated for three image pairs (e.g., $I_0$ and $I_1$, $I_1$ and $I_2$, and $I_2$ and $I_3$), respectively, for the four images. Meanwhile, as described above, the provision of the interpolation image 545 based on the AI model 540 is merely an example, and it will be appreciated by one of ordinary skill in the art that interpolation image 545 may be identified even based on an algorithm other than the AI model 540.

Referring back to FIG. 5A, according to an embodiment of the disclosure, in operation 507, the electronic device 101 may adjust at least one interpolation image 545 using the discontinuous map 535 and the plurality of first image frames 520 to provide at least one final interpolation image 570 in operation 507. The electronic device 101 may select a reference image frame (Iref) 555 as one of the preceding image (e.g., $I_1$) or the following image (e.g., $I_2$). The selection criterion 550 is not limited. For example, when an interpolation image frame for two input image pairs (e.g., $I_1$ and $I_2$ in FIG. 5B) is generated, $I_1$ may be the preceding image frame, and $I_2$ may be the following image frame. The electronic device 101 may provide the final interpolation image 570 based on, e.g., a weighted sum 560. The weighted sum 560 may be equal to Equation 1.

$$D*Iref+(1-D)*Ic \qquad \text{Equation 1}$$

In Equation 1, D may be the value of the corresponding area (or pixel) in the discontinuous map 535. Iref may be the value of the corresponding area (or pixel) of the reference image frame (Iref) 555. Ic may be the value of the area (or pixel) of the interpolation image frame (Ic) 545.

For example, for the first area 570*a* of the final interpolation image 570, D in Equation 1 may be 0 which is the value of the first area 535*a* of the discontinuous map, Ic in Equation 1 may be the value of the first area 545*a* of the interpolation image frame, and Iref in Equation 1 may be the value of the first area 555*a* of the reference image frame so that the value $I_c(0,0)$ of the first area 570*a* may be 0*Iref+ (1−0)*Ic, i.e., Ic. That the value of the first area 535*a* of the discontinuous map is 0 may mean that the corresponding area is an interpolation-applied area. Accordingly, the first area 535*a* may be Ic. For example, for the second area 570*b* of the final interpolation image 570, D in Equation 1 may be 0 which is the value of the second area 535*b* of the discontinuous map, Ic in Equation 1 may be the value of the second area 545*b* of the interpolation image frame, and Iref in Equation 1 may be the value of the second area 555*b* of the reference image frame so that the value $I_c(0,1)$ of the second area 570*b* may be 0*Iref+(1−0)*Ic, i.e., Ic. That the value of the second area 535*b* of the discontinuous map is 0 may mean that the corresponding area is an interpolation-applied area. Accordingly, the second area 570*a* may be Ic.

For example, for the third area 570c of the final interpolation image 570, D in Equation 1 may be 1 which is the value of the third area 535c of the discontinuous map, Ic in Equation 1 may be the value of the third area 545c of the interpolation image frame, and Iref in Equation 1 may be the value of the third area 555c of the reference image frame so that the value $I_c(1,0)$ of the third area 570c may be 1*Iref+(1−1)*Ic, i.e., Iref. That the value of the third area 535c of the discontinuous map is 1 may mean that the corresponding area is an interpolation non-applied area. Accordingly, the third area 570c may be Iref.

For example, for the fourth area 570d of the final interpolation image 570, D in Equation 1 may be 0.8 which is the value of the fourth area 535d of the discontinuous map, Ic in Equation 1 may be the value of the fourth area 545d of the interpolation image frame, and Iref in Equation 1 may be the value of the fourth area 555d of the reference image frame so that the value $I_c(1,1)$ of the fourth area 570d may be 0.8*Iref+(1−0.8)*Ic, i.e., 0.8*Iref+0.2*Ic. That the value of the fourth area 535d of the discontinuous map 535 is 0.8 may mean that the probability that the corresponding area is an interpolation non-applied area is 0.8. Thus, the fourth area 570d may be set as the weighted sum of 0.8*Iref+0.2*Ic. Meanwhile, in another embodiment of the disclosure, the electronic device 101 may set the value of the corresponding area as the value of the image frame having the higher weight of both the image frames. For example, when the value of a specific area of the discontinuous map is 0.5 or more, the value of the reference image frame may be used for the corresponding area and, when the value of the specific area of the discontinuous map is less than 0.5, the value of the interpolation image frame may be used for the corresponding area. As described above, a modified interpolation image frame may be provided based on the discontinuous map (or may be identification information about the interpolation-applied object (or area) and/or interpolation non-applied object (or area)), interpolation image frame, and original image frame. In the modified interpolation image frame, the interpolation-applied object (or area) may include at least part of information about the interpolation image frame, and the interpolation non-applied object (or area) may include at least part of the information about the original image frame.

Figure 5C:
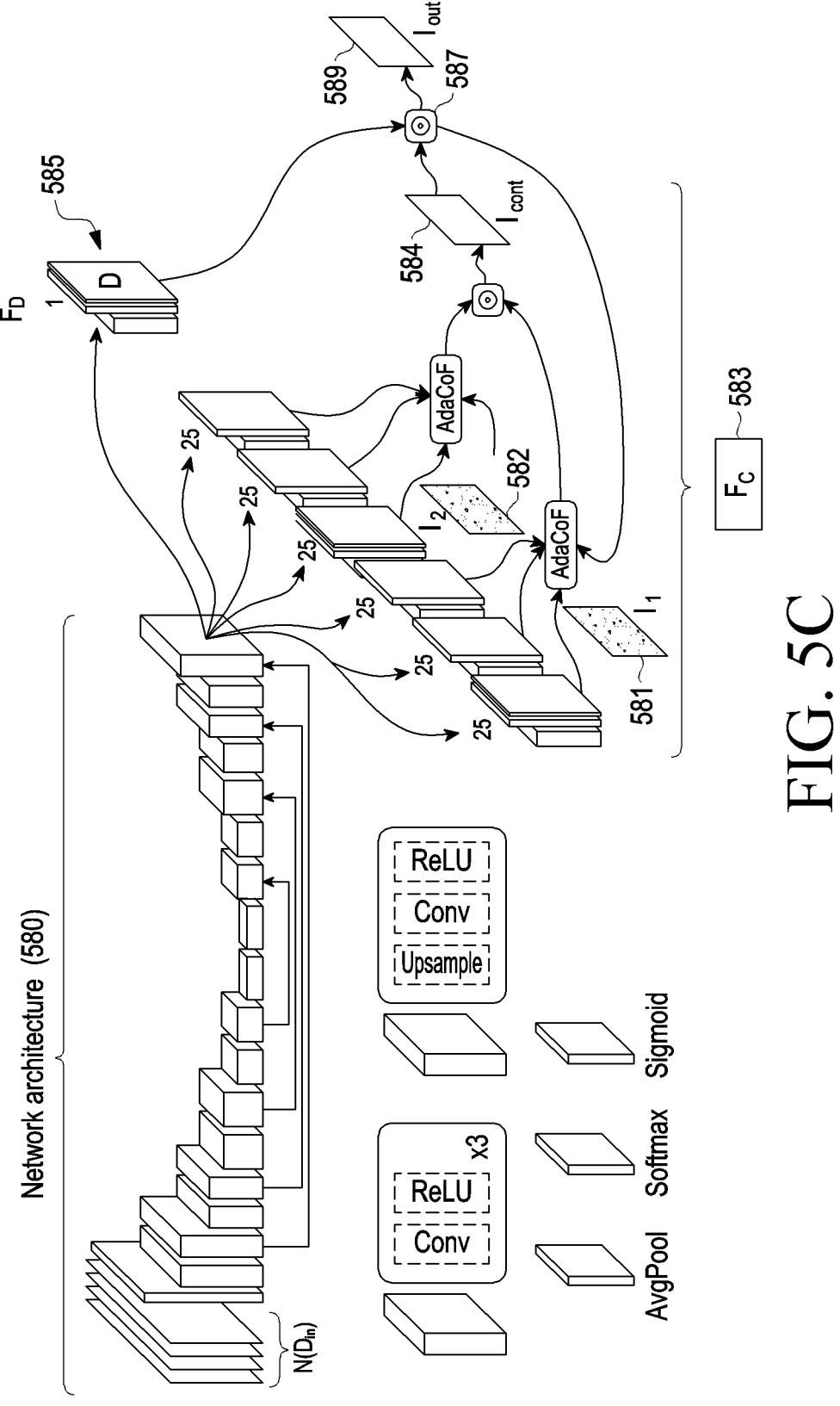
FIG. 5C is a view illustrating an interpolation image frame generation operation according to an embodiment of the disclosure.

FIG. 5C is a view illustrating an interpolation image frame generation operation according to an embodiment of the disclosure.

Referring to FIG. 5C, the electronic device 101 may obtain a feature using a network architecture 580. As the network architecture 580, a convolutional neural network of U-Net is used. For example, it may include a convolution layer (cony), a ReLU layer, an average pooling (AvgPooling) layer, a softmax layer, and/or a sigmoid layer. There is no limitation on the type of the network architecture 580, the number of layers, and/or the type of each layer. The network architecture 580 may be designed to provide the above-described discontinuous map 585 (or provide the feature for generating the discontinuous map 585) as, e.g., part of the feature (or may be defined as a concept different from the feature). The network architecture 580 may be designed to receive, e.g., $N(D_{in})$ image frames. $N(D_{in})$ is not limited as long as it is plural, preferably three or more, but is not limited. $N(D_{in})$ may be set considering the trade-off between the accuracy of the discontinuous map 585 and resource consumption (load consumption and/or power consumption), but the setting criterion is not limited.

According to an embodiment of the disclosure, a discontinuous map 585 may be created based on $N(D_{in})$ input image frames. The artificial intelligence model $F_D$ to provide the discrete map 585 may be trained based on a training data set including various interpolation non-applied objects (or areas). A method for generating a training data set and an embodiment of a training operation (e.g., content associated with a loss function used in the training operation) are described below. The discontinuous map 585 may be provided based on application of the artificial intelligence model F D of $N(D_{in})$ input image frames. The AI model $F_D$ may be referred to as, e.g., a subnetwork and be designed to receive, e.g., $N(D_{in})$ image frames (e.g., four image frames or 128 channel inputs), but the number is not limited. An interpolation image frame ($I_{cont}$) 584 may be provided based on an artificial intelligence model ($F_C$) 583 for interpolation. In the embodiment of FIG. 5C, as an example of the artificial intelligence model $F_c$ for interpolation, AdaCoF is used, but one of ordinary skill in the art will understand that the model for interpolation is not limited. The AI model $F_C$ may be referred to as, e.g., a subnetwork and be designed to receive, e.g., two image frames (e.g., 64 channel inputs), but the number is not limited. For example, the interpolation image frame ($I_{cont}$) 584 for the first image $I_1$ and the second image $I_2$ may be provided based on application of the two image frames (e.g., a first image ($I_1$) 581 and a second image (12) 582) adjacent to each other in time series to the artificial intelligence model $F_C$. The electronic device 101 may provide a final interpolation image frame (Iout) 589 based on processing (587) on the interpolation image frame ($I_{cont}$) 584, the discontinuous map 585, and any one (e.g., image frame as the reference image frame) of the first image $I_1$ or the second image $I_2$. An embodiment of the operation of providing the final interpolation image frame (Iout) 589 based on processing (587) on the interpolation image frame ($I_{cont}$) 584, the discontinuous map 585, and any one (e.g., image frame as the reference image frame) of the first image $I_1$ or the second image $I_2$ has been described with reference to FIG. 5B, and thus, no detailed description thereof is repeated below. Meanwhile, although not shown, the electronic device 101 may perform the above-described operations on other image frame pairs. For example, if $N(D_{in})$ is 4, the electronic device 101 may provide the final interpolation image frame corresponding to the second image $I_2$ and the third image $I_3$ and the final interpolation image frame corresponding to the third image $I_3$ and the fourth image $I_4$.

Figure 5D:
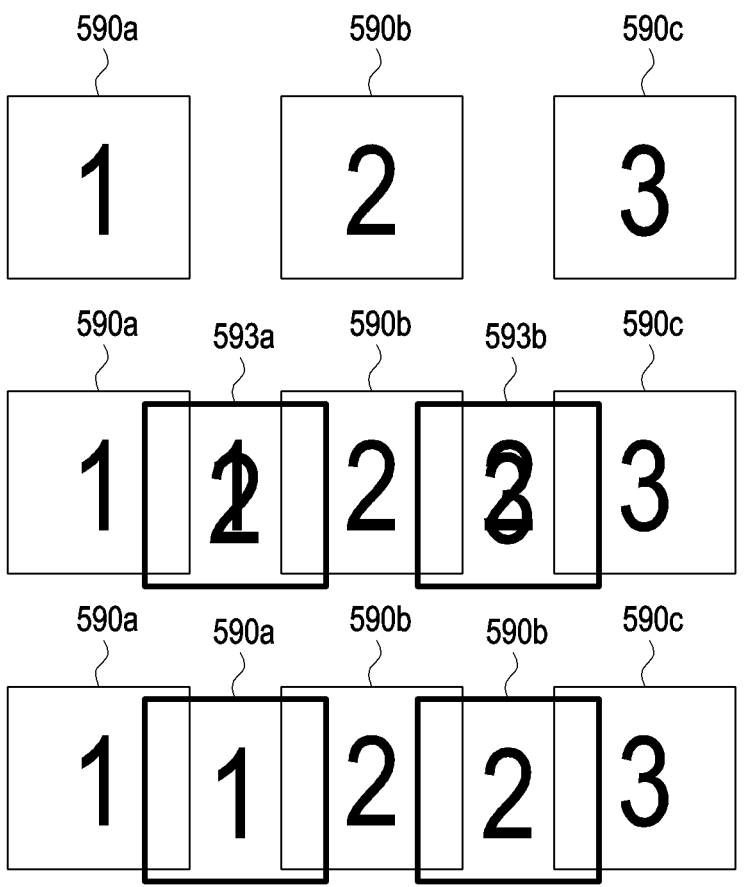
FIG. 5D is a view illustrating a difference between an interpolation result and an interpolation result according to an embodiment of the disclosure.

FIG. 5D is a view illustrating a difference between an interpolation result according to an embodiment and an interpolation result according to an embodiment of the disclosure.

Referring to FIG. 5D, for example, it is assumed that a first image frame, a second image frame, and a third image frame are included. The first image frame may include, e.g., an interpolation non-applied object (or area) 590a, and the interpolation non-applied object (or area) 590a may include, e.g., the text of "1". The second image frame may include, e.g., an interpolation non-applied object (or area) 590b, and the interpolation non-applied object (or area) 590b may include, e.g., the text of "2". The third image frame may include, e.g., an interpolation non-applied object (or area) 590c, and the interpolation non-applied object (or area) 590c may include, e.g., the text of "3". Meanwhile, the interpolation result of the first image frame and the second image frame may include an area 593a having such a shape as if the text of "1" and the text of "2" overlap each other. The interpolation result of the second image frame and the third image frame may include an area 593b having such a shape as if the text of "2" and the text of "3" overlap each other. Accordingly, when the original image frames and the interpolation image frames are reproduced, areas 593a and 593b where texts are mixed may be reproduced in the middle, causing quality deterioration.

According to an embodiment of the disclosure, the electronic device 101 may use an object (or area) set as a reference image frame (in this embodiment of the disclosure, a preceding image frame) for the interpolation non-applied object (or area). Accordingly, the interpolation result of the first image frame and the second image frame may include an interpolation non-applied object (or area) 590a of the preceding image frame, and the interpolation result of the second image frame and the third image frame may include an interpolation non-applied object (or area) 590b of the preceding image frame. Accordingly, when the original image frames and the interpolation image frames are reproduced, the texts of "1", "2", and "3" may be sequentially reproduced instead of the areas 593a and 593b where texts are mixed in the middle, preventing quality deterioration. Meanwhile, this embodiment may relate to a case where the discontinuous map has a value of "0" or "1". Or, the embodiment may relate to an area having a value of "1" when the discontinuous map has a real value between "0" and "1". Or, the embodiment may relate to an area having a value equal to or larger than a threshold when the discontinuous map has a real value between "0" and "1". Meanwhile, the embodiment of FIG. 5D is an example, and it will be appreciated by one of ordinary skill in the art that when the discontinuous map has real values between "0" and "1", in the area having real values between "0" and "1", the corresponding area may be determined based on the weighted sum as shown in Equation 1.

Figure 6A:
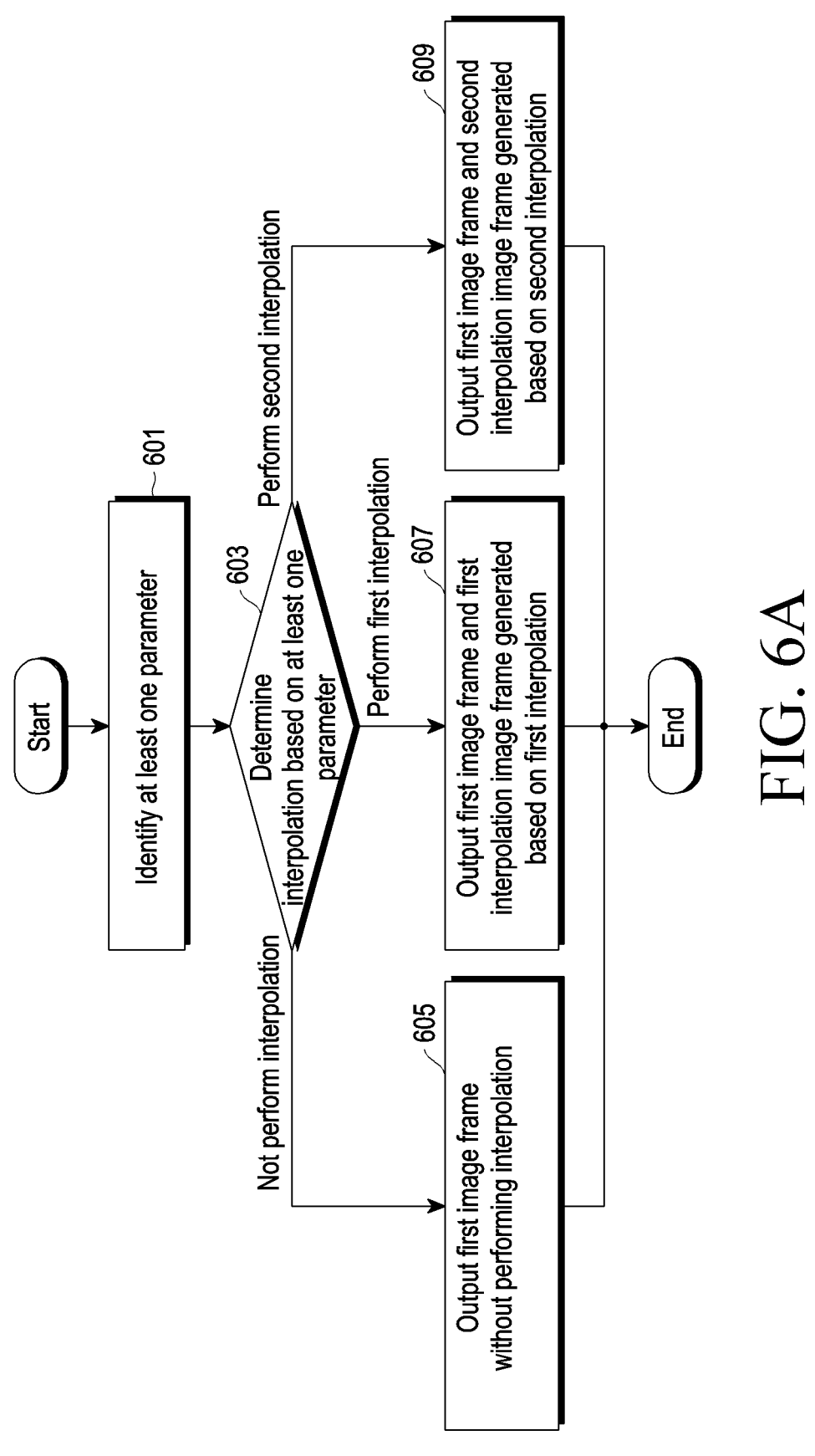
FIG. 6A is a flowchart illustrating an operation method of an electronic device according to an embodiment of the disclosure.

FIG. 6A is a flowchart illustrating an operation method of an electronic device according to an embodiment of the disclosure.

Referring to FIG. 6, according to an embodiment of the disclosure, the electronic device 101 (e.g., the processor 120 of FIG. 1) may identify at least one parameter in operation 601. In operation 603, the electronic device 101 may determine interpolation (or interpolation performing mode) based on at least one parameter. If it is determined not to perform interpolation (interpolation not performed), the electronic device 101 may output the first image frame without performing interpolation, in operation 605. If it is determined to perform the first interpolation, in operation 607, the electronic device 101 may output a first interpolation image frame and a first image frame generated based on the first interpolation. The first interpolation is, e.g., interpolation that does not perform additional interpolation image frame modification based on the discontinuous map and may be, e.g., an artificial intelligence model denoted by $F_C$ like AdaCoF, but is not limited. If it is determined to perform the second interpolation, in operation 609, the electronic device 101 may output the second interpolation image frame and the first image frame generated based on the second interpolation. The second interpolation may be defined as, e.g., interpolation that provides an interpolation image finally modified based on the input image frames, the interpolation image, and the discontinuous map, as described above.

For example, the electronic device 101 may determine whether to perform interpolation and/or the type of interpolation, based on the current temperature (or temperature margin) as at least one example of the at least one parameter in FIG. 6A. Here, the temperature margin may be, e.g., the difference between a threshold temperature and the current temperature, but is not limited. The temperature may include the temperature of at least one of the surface and/or inside of the electronic device 101. The electronic device 101 may include at least one temperature sensor inside the electronic device 101. For example, the at least one temperature sensor may be included inside and/or on the surface of a component (e.g., processor) included in the electronic device 101. For example, when the temperature margin is relatively large (e.g., may be replaced with when the temperature margin is equal to or larger than a threshold temperature margin or when the temperature is the threshold temperature or less), the electronic device 101 may be configured to perform second interpolation that has relatively large resource consumption. Meanwhile, when the temperature margin is relatively low (e.g., may be replaced with when the temperature margin is the threshold temperature margin or less or when the temperature is the threshold temperature or more), the electronic device 101 may be configured to perform first interpolation that has relatively low resource consumption. Meanwhile, when there is no temperature margin (e.g., when the current temperature is overtemperature, but there is no limitation), the electronic device 101 may determine not to perform interpolation.

For example, the electronic device 101 may determine whether to perform interpolation and/or the type of interpolation based on the current resource (e.g., value associated with use of memory, use of core, use of network, and/or use of battery, but not limited)(or resource margin) as at least one example of at least one parameter in FIG. 6A. Here, the resource margin may be, e.g., the difference between the maximum resource and the current resource, but is not limited. For example, when the resource margin is relatively large (e.g., may be replaced with when the resource margin is equal to or larger than a threshold resource margin or when the resource is the threshold resource or less), the electronic device 101 may be configured to perform second interpolation that has relatively large resource consumption. Meanwhile, when the resource margin is relatively low (e.g., may be replaced with when the resource margin is the threshold resource margin or less or when the resource is the threshold resource or more), the electronic device 101 may be configured to perform first interpolation that has relatively low resource consumption. Meanwhile, when there is no resource margin (e.g., when the resource is substantially the maximum value, but there is no limitation), the electronic device 101 may determine not to perform interpolation.

For example, the electronic device 101 may be implemented as a glasses-type wearable electronic device and provide augmented reality (AR) content. Since the glasses-type wearable electronic device has a relatively large number of always-on hardware components (e.g., camera module, sensor module, and display module), the amount of heat generated may be relatively large. Further, since the quality of AR content is enhanced as the FR is relatively high, interpolation may be required. Further, AR content may include additional information associated with the subject in the real world. Accordingly, there is a high possibility that a relatively large number of objects are interpolation non-applied objects. Further, in the glasses-type wearable electronic device, since the distance between the user's eye and the displayed part is relatively small, even a small error may be greatly perceived by the user. In one example, the electronic device 101 may be configured to perform second interpolation when the number of AR objects included in augmented reality (AR) content is relatively large. In one example, the electronic device 101 may be configured to perform the second interpolation when the area occupied by the AR object is relatively large. In one example, the electronic device 101 may be configured to perform the second interpolation when the gaze recognition area is relatively wide. When the gaze recognition area is relatively wide, there may be a high possibility that an object affecting the user's recognition exists. Meanwhile, the gaze recognition area may be used to identify the area occupied by the AR object. Meanwhile, the electronic device 101 may be implemented as a head mounted display (HMD) for providing virtual reality (VR) contents, or as a video see-through (VST) device that at least partially mixes and provides VR contents and images of the external environment. It will be appreciated by one of ordinary skill in the art that the above-described conditions for applying interpolation may also be applied to HMDs or VST devices.

Meanwhile, in an embodiment of the disclosure, when the number of AR objects included in the AR content is relatively large, a threshold for determining whether to perform the second interpolation may be relaxed (e.g., the threshold temperature margin is reduced). In this embodiment of the disclosure, the electronic device 101 may determine whether to perform the second interpolation based on the temperature and/or resource, and adjust conditions for determining whether to perform the second interpolation based on information associated with the AR content. (e.g., adjusting the threshold). For example, when the area occupied by the AR object is relatively large, the electronic device 101 may be configured to relax the threshold for determining whether to perform the second interpolation (e.g., reduce the threshold temperature margin). In one example, the electronic device 101 may be configured to relax the threshold for determining whether to perform the second interpolation (e.g., reduce a threshold temperature margin) when the gaze recognition area is relatively wide.

For example, the electronic device 101 may be implemented as an electronic device with a transformable housing (e.g., a foldable electronic device or a rollable electronic device). As the shape of the housing is changed, the size of the screen for the electronic device to provide content may be changed. For example, in the case of a foldable device, the size of the display area activated in the unfolding state may be larger than the size of the display area activated in the folding state. For example, in the case of a rollable device, the size of the display area activated in the unrolled state may be larger than the size of the display area activated in the rolled state. For example, the larger the size of the activated display area is, the higher the possibility that an interpolation non-applied object is included is. The electronic device 101 may be configured to perform second interpolation when the current state identified with at least one parameter is a state in which the activated display area is relatively large (e.g., unfolding state or unrolled state). Or, the electronic device 101 may be configured to relax the threshold for the condition for determining whether to perform second interpolation (e.g., reduce the threshold temperature margin) when the current state identified with at least one parameter is a state in which the activated display area is relatively large (e.g., unfolding state or unrolled state).

For example, the electronic device 101 may determine interpolation based on the size of the provided image frame. For example, as the size of the provided image frame is relatively small, the possibility that an interpolation non-applied object is to be included in the image frame may increase. The electronic device 101 may be configured to perform scene information or relax the threshold for the condition for determining whether to perform second interpolation (e.g., reduce the threshold temperature margin) as the size of the image frame identified with at least one parameter is relatively large. For example, the electronic device 101 may determine interpolation based on the number of displays wiredly or wirelessly connected to the electronic device 101. For example, the greater the number of connected displays is, the higher the possibility that an interpolation non-applied object including split rendering is included in the image frame may be. The electronic device 101 may be configured to perform scene information or relax the threshold for the condition for determining whether to perform second interpolation (e.g., reduce the threshold temperature margin) as the number of connected displays is relatively large. For example, the electronic device 101 may determine interpolation based on the number of visual activities on the electronic device 101. For example, when the number of visual activities is relatively large, the possibility that different types of UIs are to be provided and/or the possibility that a discontinuous movement is to be represented at the border of the visual activity may be high. The electronic device 101 may be configured to perform scene information or relax the threshold for the condition for determining whether to perform second interpolation (e.g., reduce the threshold temperature margin) as the number of visual activities is relatively large.

Figure 6B:
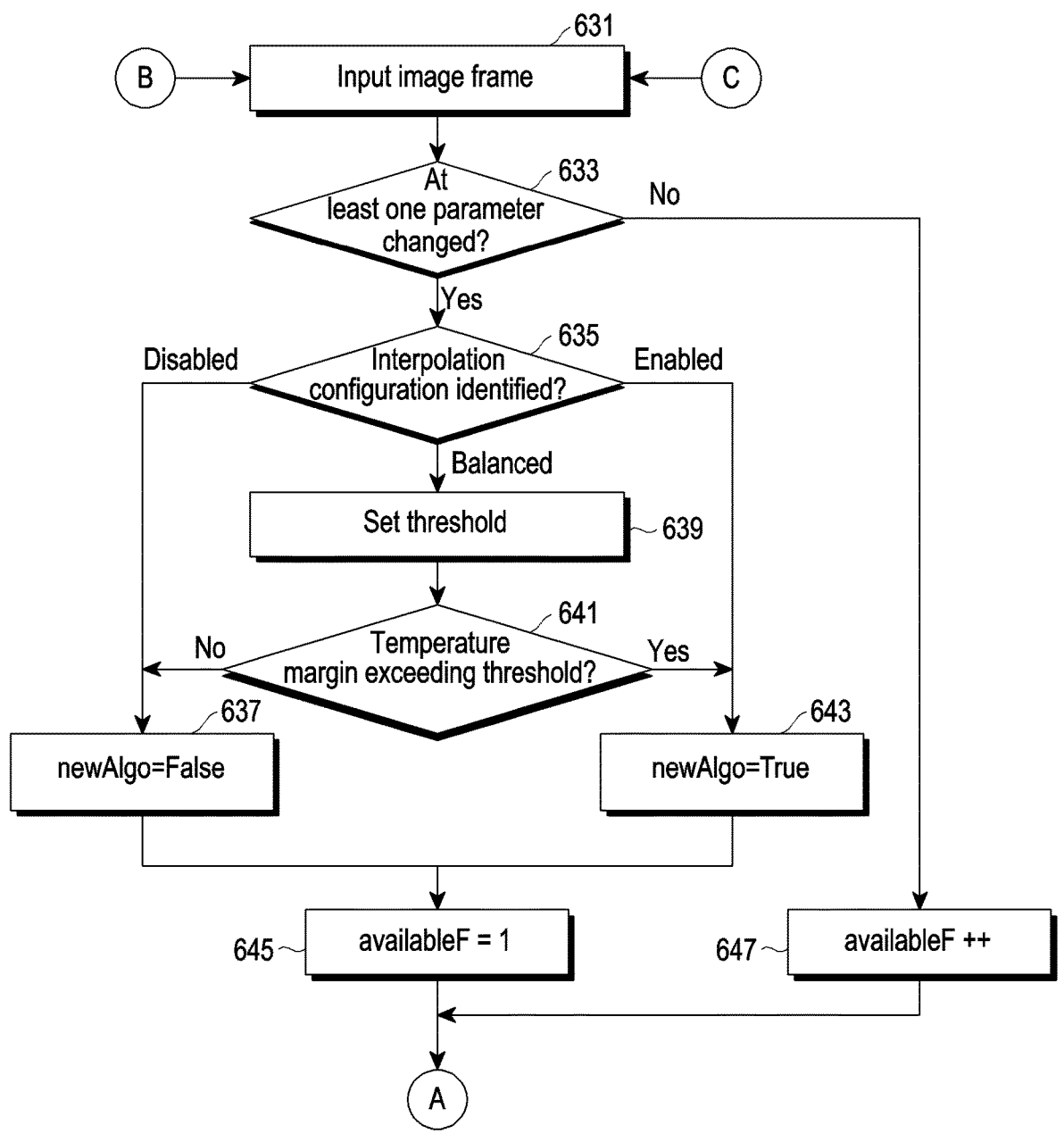
FIGS. 6B and 6C are flowcharts illustrating an operation method of an electronic device according to various embodiments of the disclosure.
Figure 6C:
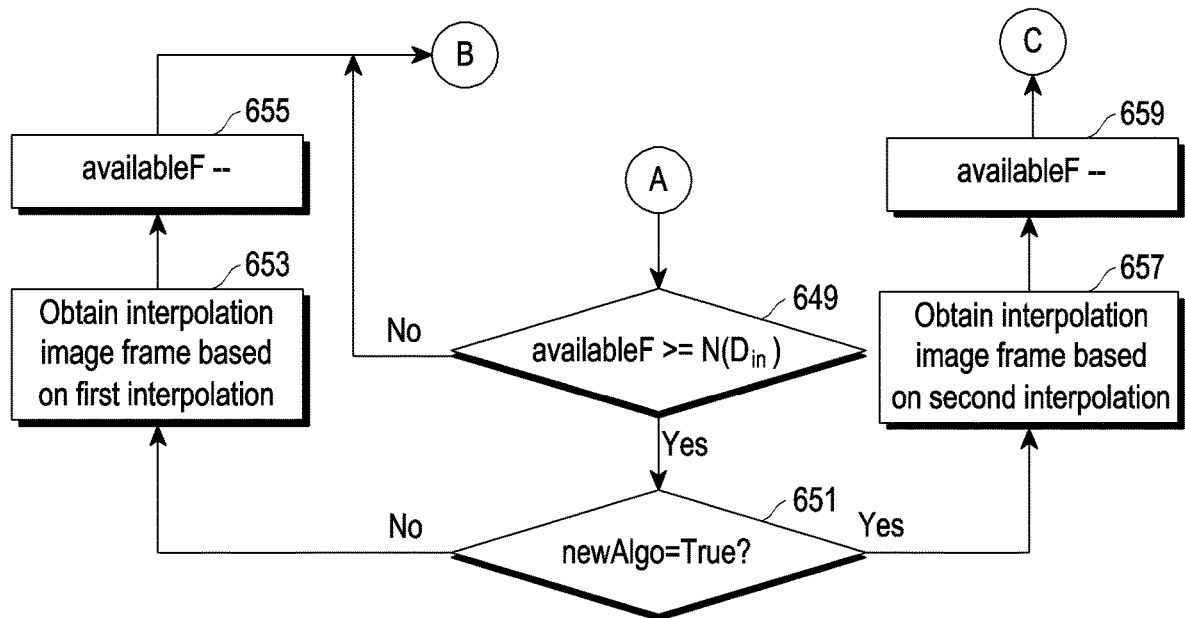

FIGS. 6B and 6C are flowcharts illustrating an operation method of an electronic device according to various embodiments of the disclosure.

Referring to FIGS. 6B and 6C, according to an embodiment of the disclosure, the electronic device 101 (e.g., the processor 120 of FIG. 1) may receive an image frame in operation 631. In operation 633, the electronic device 101 may identify whether at least one parameter is changed. As described above, the at least one parameter is not limited to a specific one as long as it is a parameter for determining whether to perform second interpolation and/or determining a factor (e.g., threshold) constituting the condition for determining whether to perform second interpolation. If a change in at least some of at least one parameter is not identified (no in 633), the electronic device 101 may increase the availableF value in operation 647. Here, availableF may mean the number of frames suitable for performing interpolation. For example, if availableF is 3, it may mean that, according to an embodiment of the disclosure, three image frames suitable for interpolation are secured.

If a change in at least some of the at least one parameter is identified (yes in 633), the electronic device 101 may identify an interpolation configuration in operation 635. If the interpolation configuration is disabled, the electronic device 101 may identify not to perform a new algorithm (e.g., the second interpolation described above) in operation 637, and the electronic device 101 may set the value of newAlgo to false. The value of newAlgo may be, e.g., a factor for managing whether to use a new algorithm (e.g., the second interpolation described above).

If the interpolation configuration is set to balanced, the electronic device 101 may set a threshold of a condition for determining whether to perform the new algorithm (e.g., the above-described second interpolation) in operation 639. In the case of the balanced setting, the electronic device 101 may use the new algorithm (e.g., the above-described second interpolation) if the condition is satisfied and, if the condition is not met, use the existing algorithm (e.g., the above-described first interpolation). For example, it has been described that the threshold for the condition may be adjusted based on the image frame size, the number of displays connected, the number of visual activities, the number of AR objects, the area of the AR object, gaze tracking area, and/or the size of the activated display area, and no detailed description thereof is repeated below. In operation 641, the electronic device 101 may identify whether the temperature margin exceeds the threshold. When the temperature margin does not exceed the threshold (no in 641), the electronic device 101 may identify not to perform a new algorithm (e.g., the second interpolation described above) in operation 637, and the electronic device 101 may set the value of newAlgo to false. When the temperature margin exceeds the threshold (yes in 641), the electronic device 101 may identify to perform a new algorithm (e.g., the second interpolation described above) in operation 643, and the electronic device 101 may set the value of newAlgo to true. In operation 645, the electronic device 101 may set availableF to 1. In operation 649, the electronic device 101 may identify whether availableF is $N(D_{in})$ or more. As described above, $N(D_{in})$ may be the number of input image frames of the new algorithm (e.g., the second interpolation described above). If availableF is less than $N(D_{in})$ (no in 649), the electronic device 101 may return to operation 631 and receive a new image frame.

If availableF is $N(D_{in})$ or more (yes in 649), the electronic device 101 may identify whether the value of newAlgo is true in operation 651. If the value of newAlgo is false, the electronic device 101 may obtain an interpolation image frame based on the existing algorithm (e.g., first interpolation) in operation 653. In operation 655, the electronic device 101 may decrease the value of availableF. If the value of newAlgo is true, the electronic device 101 may obtain an interpolation image frame based on the new algorithm (e.g., second interpolation) in operation 657. In operation 659, the electronic device 101 may decrease the value of availableF. As described above, the electronic device 101 may perform the new algorithm (e.g., second interpolation) based on whether to satisfy the threshold set based on various parameters and/or the configuration of interpolation.

Figure 6D:
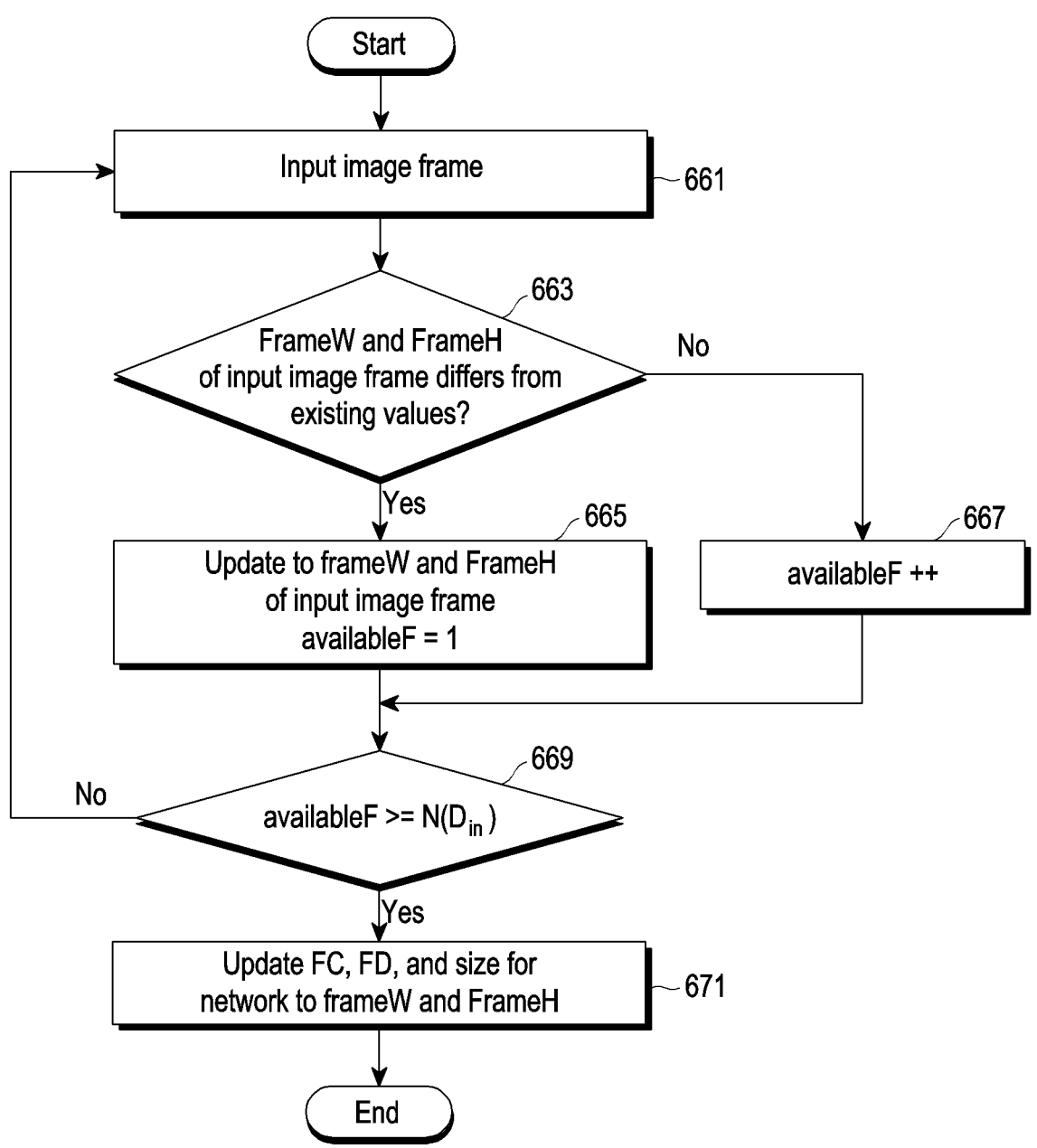
FIG. 6D is a flowchart illustrating an operation method of an electronic device according to an embodiment of the disclosure.

FIG. 6D is a flowchart illustrating an operation method of an electronic device according to an embodiment of the disclosure.

Referring to FIG. 6D, according to an embodiment of the disclosure, the electronic device 101 (e.g., the processor 120 of FIG. 1) may receive an image frame in operation 661. In operation 663, the electronic device 101 may identify whether the width (frameW) and height (FrameH) of the input image frame have a difference from the existing values. If there is a difference (yes in 663), the electronic device 101 may update the width and height for interpolation to frameW and FrameH of the input image frame and set the availableF value to 1 in operation 665. If there is no difference (no in 663), the electronic device 101 may increase the value of availableF in operation 667. In operation 669, the electronic device 101 may identify whether availableF is $N(D_{in})$ or more. As described above, $N(D_{in})$ may be the number of input image frames of the new algorithm (e.g., the second interpolation described above). If availableF is less than $N(D_{in})$ (no in 669), the electronic device 101 may return to operation 661 and receive a new image frame. When availableF is $N(D_{in})$ or more (yes in 669), the electronic device 101 may update $F_C$ and $F_D$, which are the width and height for interpolation and the size for the network to frameW and FrameH, in operation 671. As described above, the widths and heights of a plurality of image frames used for interpolation may be unified.

Figure 7A:
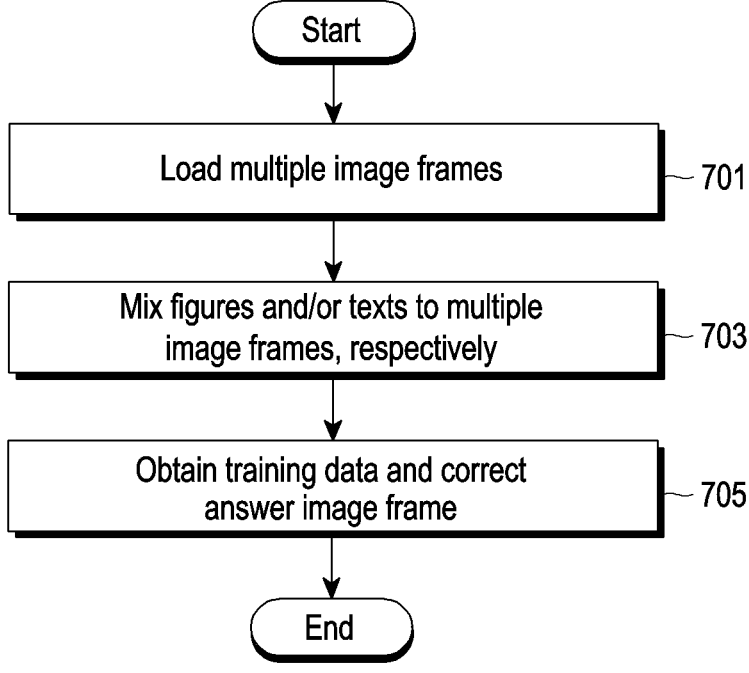
FIG. 7A is a flowchart illustrating an embodiment of generating a training data set according to an embodiment of the disclosure.
Figure 7B:
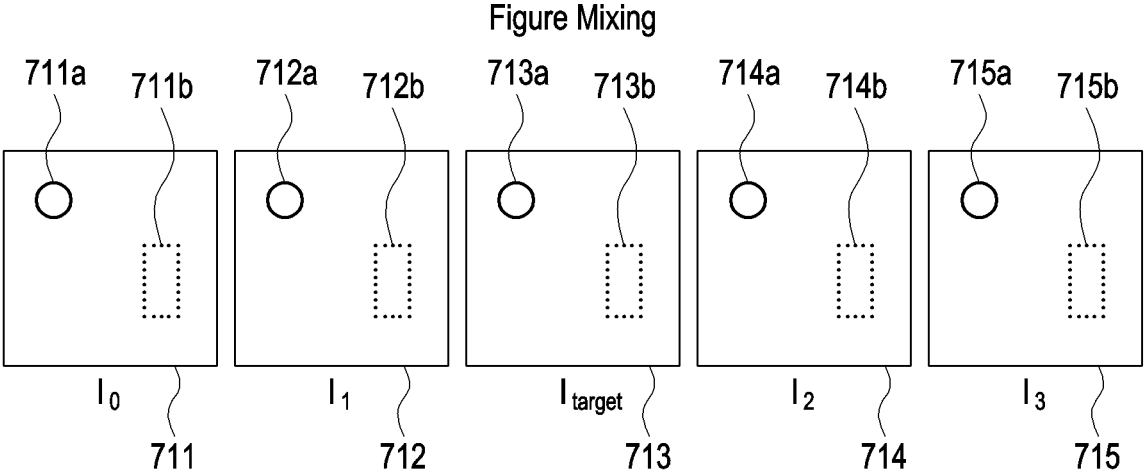
FIGS. 7B and 7C are views illustrating generating a training data set according to various embodiments of the disclosure.
Figure 7C:
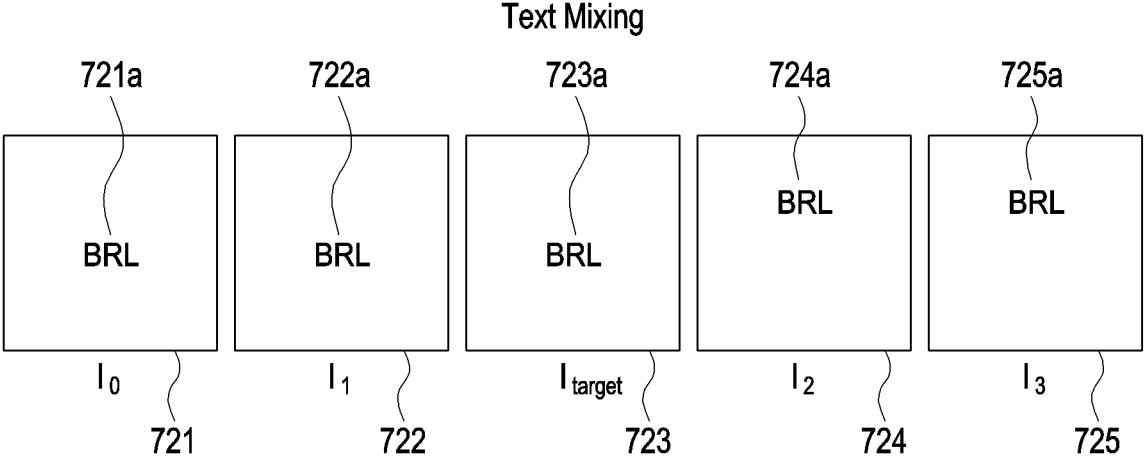

FIG. 7A is a flowchart illustrating an embodiment of generating a training data set according to an embodiment of the disclosure. The embodiment of FIG. 7A is described with reference to FIGS. 7B and 7C. FIGS. 7B and 7C are views illustrating generating a training data set according to various embodiments of the disclosure. As described above, the generation of the training data set may be performed by, e.g., an electronic device (e.g., the electronic device 101 of FIG. 1) or the external device (e.g., the server 108 of FIG. 1 but not limited) different from the electronic device 101.

Referring to FIGS. 7A, 7B, and 7C, according to an embodiment of the disclosure, the electronic device 101 (e.g., the processor 120 of FIG. 1), or the external electronic device (e.g., the server 108 but not limited) may load a plurality of image frames in operation 701. The plurality of image frames may be, e.g., time-series successive image frames, but are not limited thereto. For example, according to an embodiment of the disclosure, the electronic device 101 or the external electronic device may load the image frames 711, 712, 713, 714, and 715 in FIG. 7B. The image frames 711, 712, 713, 714, and 715 may be image frames having a time-series order for some sections of a video. The frames 721, 722, 723, 724, and 725 in FIG. 7C may be loaded. The image frames 721, 722, 723, 724, and 725 may be image frames having a time-series order for some sections of the video.

According to an embodiment of the disclosure, the electronic device 101 or the external electronic device may mix a figure and/or text to each of the plurality of image frames in operation 703. The electronic device 101 or the external electronic device may obtain training data and a correct answer image frame in operation 705. For example, referring to FIG. 7B, the electronic device 101 or the external electronic device may mix FIGS. 711*a*, 711*b*, 712*a*, 712*b*, 713*a*, 713*b*, 714*a*, 714*b*, 715*a* and 715*b* to the image frames 711, 712, 713, 714, and 715, respectively. The shape, size, color, and/or position of the FIGS. 711*a*, 711*b*, 712*a*, 712*b*, 713*a*, 713*b*, 714*a*, 714*b*, 715*a*, and 715*b* are not limited. The interpolation non-applied object is, e.g., an object covering time-series successive image frames and may have a relatively high possibility of having a shape, such as a circle or a rectangle. Accordingly, the artificial intelligence model $F_D$ capable of detecting interpolation non-applied objects may be trained by using image frames including the FIGS. 711*a*, 711*b*, 712*a*, 712*b*, 713*a*, 713*b*, 714*a*, 714*b*, 715*a*, and 715*b* as a training data set. For example, one of the mixed image frames (e.g., image frame 713) may be used as correct answer information. For example, a correct answer discontinuous map may be configured in which areas corresponding to the FIGS. 713*a* and 713*b* in the image frame 713 may be set to "1", and the remaining areas are set to "0". The artificial intelligence model $F_D$ may be trained using the training data set (e.g., image frames 711, 712, 714, and 715) and the correct answer discontinuous map. Further, the image frame 713 may be used as a correct answer as a final interpolation image frame. For example, the image frame 713 may be used as a correct answer as a final interpolation image frame for the image frames 712 and 714, but is not limited.

For example, referring to FIG. 7C, the electronic device 101 or the external electronic device may mix texts 721*a*, 722*a*, 723*a*, 724*a*, and 725*a* to the image frames 721, 722, 723, 724, and 725, respectively. The shape, size, color, and/or position of the texts 721*a*, 722*a*, 723*a*, 724*a*, and 725*a* are not limited. The interpolation non-applied object is, e.g., an object covering time-series successive image frames and may include text. Or, messages moving for a relatively short period of time in a messaging application represented by discontinuous movement may include text, and the artificial intelligence model $F_D$ capable of detecting interpolation non-applied object may be trained by using the image frames including the texts 721*a*, 722*a*, 723*a*, 724*a*, and 725*a* as the training data set. For example, one of the mixed image frames (e.g., image frame 723) may be used as correct answer information. For example, a correct answer discontinuous map may be configured in which areas corresponding to the text 723*a* in the image frame 723 may be set to "1", and the remaining areas are set to "0". The artificial intelligence model $F_D$ may be trained using the training data set (e.g., image frames 721, 722, 724, and 725) and the correct answer discontinuous map. Further, the image frame 723 may be used as a correct answer as a final interpolation image frame. For example, the image frame 723 may be used as a correct answer as a final interpolation image frame for the image frames 722 and 724, but is not limited.

Figures and/or texts to be mixed may be used independently, as shown in FIGS. 7B and 7C, but this is an example. According to an embodiment of the disclosure, the electronic device 101 or the external electronic device may generate a training data set by mixing the figures and texts with the image frames. Meanwhile, the attributes (e.g., color, line thickness, or size, but not limited) of the figures and/or texts mixed may be maintained or changed. As described above, a training data set for training an artificial intelligence model for detecting an interpolation non-applied object (or area) may be generated.

Figure 8:
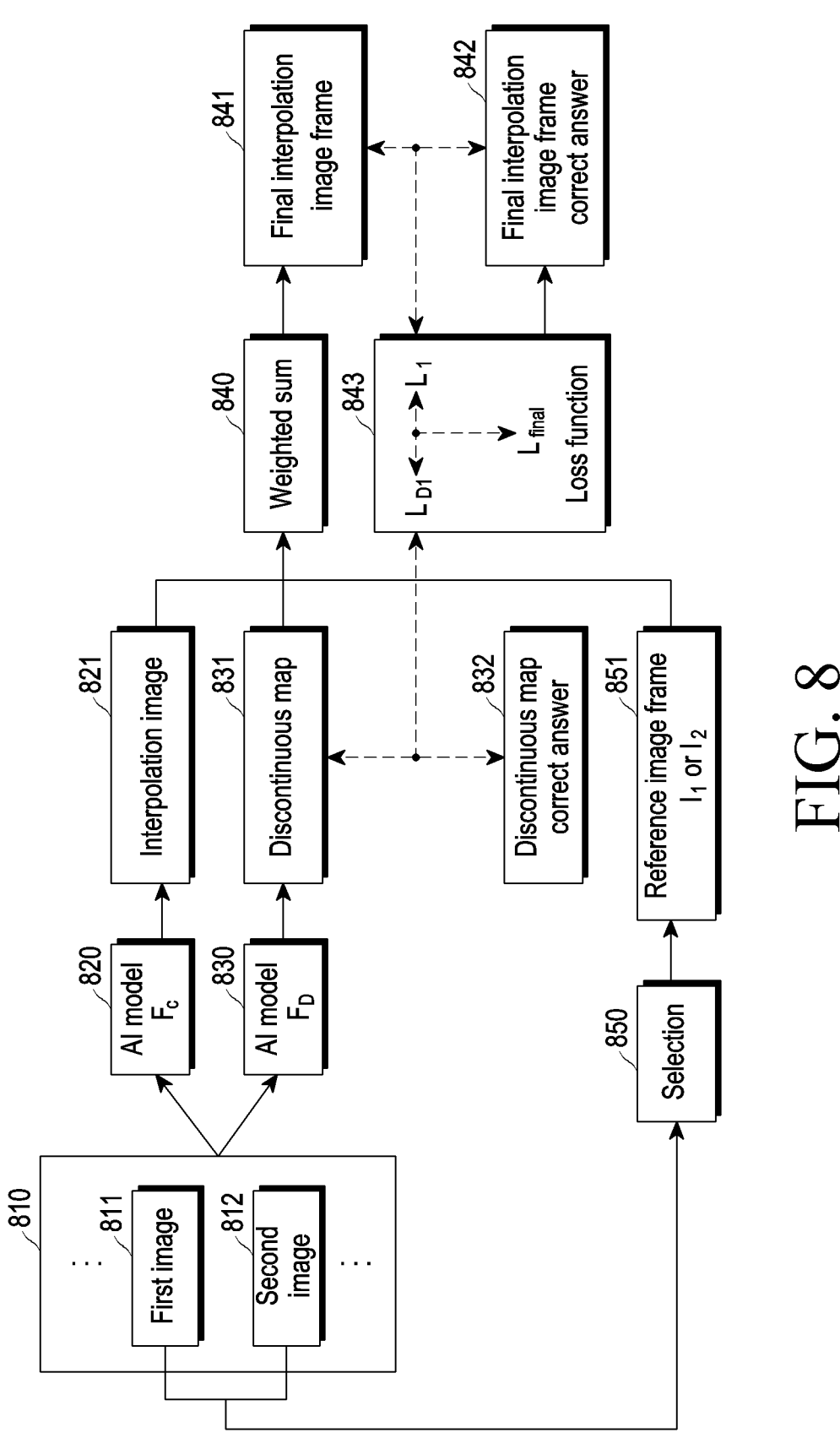
FIG. 8 is a view illustrating training an AI model according to an embodiment of the disclosure.

FIG. 8 is a view illustrating training an AI model according to an embodiment of the disclosure. As described above, AI model training may be performed by, e.g., the electronic device 101 or an external device (e.g., the server 108 of FIG. 1 but not limited) different from the electronic device 101.

Referring to FIG. 8, according to an embodiment of the disclosure, the electronic device 101 (e.g., the processor 120 of FIG. 1), or the external electronic device (e.g., the server 108 but not limited) may load input image frames 810. The number $N(D_{IN})$ of the input image frames 810 may be plural, e.g., four, but is not limited. It is assumed that training is performed on a first image frame 811 and a second image frame 812 among the input image frames 810. For example, a correct answer 832 (e.g., the discontinuous map corresponding to the image frame 713 of FIG. 7B or the discontinuous map corresponding to the image frame 723 of FIG. 7C) of the discontinuous map and the correct answer 842 (e.g., the image frame 713 of FIG. 7B or the image frame 723 of FIG. 7C) of the final interpolation image frame, together with the training data set, may be input as described in connection with FIGS. 7A to 7C.

According to an embodiment of the disclosure, the electronic device 101 or the external electronic device may input an image frame pair 811 and 812 to an AI model ($F_C$) 820 for interpolation and obtain an interpolation image 821 which is the output value of the AI model ($F_C$) 820. The electronic device 101 or the external electronic device may input the input image frames 810 to an AI model ($F_D$) 830 for discontinuous map estimation and obtain a discontinuous map 831 which is the output value of the AI model ($F_D$) 830.

According to an embodiment of the disclosure, the electronic device 101 or the external electronic device may input the discontinuous map 831 and the correct answer 832 of the discontinuous map to a loss function ($L_{D1}$) 843 for the discontinuous map. According to an embodiment of the disclosure, the electronic device 101 or external electronic device may identify the output value of the loss function $L_{D1}$.

According to an embodiment of the disclosure, the electronic device 101 or an external electronic device may select (850) a reference image frame 851. The criterion for the selection 850 is not limited, and accordingly, any one of the first image frame 811 and the second image frame 812 may be selected as the reference image frame 851.

According to an embodiment of the disclosure, the electronic device 101 or external electronic device may calculate the weighted sum 840 of the interpolation image frame 821, the discontinuous map 831, and the reference image frame 851, obtaining the final interpolation image frame 841. The electronic device 101 or external electronic device may input the final interpolation image frame 841 and the correct answer 832 of the final interpolation image frame to the loss function $L_1$. The electronic device 101 or external electronic device may obtain the output value of the loss function $L_1$.

According to an embodiment of the disclosure, the electronic device 101 or external electronic device may obtain the sum of the output value of the loss function $L_{D1}$ and the output value of the loss function $L_1$ as the output value of the final loss function $L_{final}$. Meanwhile, setting the sum of the output value of the loss function $L_{D1}$ and the output value of the loss function $L_1$ as the output value of the final loss function $L_{final}$ is merely an example, and it will be appreciated by one of ordinary skill in the art that computation using the output value of the loss function $L_1$ and the loss function $L_1$ is not limited. The electronic device 101 or external electronic device may train the AI model 820 and/or AI model 830 (e.g., adjust parameters) to minimize the output value of the final loss function $L_{final}$.

Meanwhile, training the AI model 820 and/or AI model 830 to minimize the output value of the final loss function $L_{final}$ is merely an example and, according to an embodiment of the disclosure, the electronic device 101 or external electronic device may train the AI model 830 to minimize the output value of the loss function $L_{D1}$. The electronic device 101 or external electronic device may input the interpolation image frame 821 and the final interpolation image frame correct answer 842 to the loss function $L_1$, obtaining the output value of the loss function $L_1$. The electronic device 101 or external electronic device may train the AI model 820 to minimize the output value of the loss function $L_1$.

Meanwhile, upon performing training for first interpolation, the electronic device 101 or external electronic device may input the interpolation image frame 821 and the final interpolation image frame correct answer 842 to the loss function $L_1$, obtaining the output value of the loss function $L_1$. The electronic device 101 or external electronic device may train the AI model 820 to minimize the output value of the loss function $L_1$.

According to an embodiment of the disclosure, the electronic device 101 may comprise the processor 120 and the memory 130. The memory 130 may store at least one instruction that, when executed by the at least one processor 120, enables the electronic device 101 to obtain a first image frame and a second image frame. The memory 130 may store at least one instruction that, when executed by the processor 120, enables the electronic device 101 to identify a first interpolation-applied object and a first interpolation non-applied object among objects included in the first image frame and identify a second interpolation-applied object and a second interpolation non-applied object among objects included in the second image frame. Here, the first interpolation-applied object and the second interpolation-applied object may be objects having a gradually continuous movement in the first image frame and the second image frame. Here, the first interpolation non-applied object and the second interpolation non-applied object may be objects having no gradually continuous movement in the first image frame and the second image frame. The memory 130 may store at least one instruction that, when executed by the processor 120, enables the electronic device 101 to provide an interpolation image frame including a result of interpolation on the first interpolation-applied object and the second interpolation-applied object and the first interpolation non-applied object or the second interpolation non-applied object.

According to an embodiment of the disclosure, the at least one instruction, when executed, enables the electronic device 101 to, as at least part of identifying the first interpolation-applied object and the first interpolation non-applied object and identifying the second interpolation-applied object and the second interpolation non-applied object, identify a discontinuous map corresponding to the first image frame and the second image frame. The discontinuous map may include information for identifying the first interpolation-applied object, the first interpolation non-applied object, the second interpolation-applied object, and/or the second interpolation non-applied object.

According to an embodiment of the disclosure, the discontinuous map may include at least one area. Each of the at least one area may have a real number value between a first value and a second value. The at least one area may have the first value in case that the at least one area is an interpolation-applied object. The at least one area may have the second value in case that the at least one area is an interpolation non-applied object.

According to an embodiment of the disclosure, the at least one instruction, when executed, may enable the electronic device 101 to, as at least part of providing the interpolation image frame, determine a value of a first area of the interpolation image frame by a following equation. The equation may be $D*Iref+(1-D)*Ic$. In the equation, D may be the value of the first area of the discontinuous map, Iref may be the value of the first area of either the first image frame or the second image frame, and Ic may be the value of the first area of the result of interpolation on the first image frame and the second image frame.

According to an embodiment of the disclosure, a value of an area corresponding to the first interpolation-applied object and the second interpolation-applied object, of the discontinuous map, may be the first value. A value of an area corresponding to the first interpolation non-applied object and the second interpolation non-applied object, of the discontinuous map, may be the second value.

According to an embodiment of the disclosure, the discontinuous map may include at least one area. Each of the at least one area may have a first value or a second value. The at least one area may have the first value in case that the at least one area is an interpolation-applied object. The at least one area may have the second value in case that the at least one area is an interpolation non-applied object. A value of an area corresponding to the first interpolation-applied object and the second interpolation-applied object, of the discontinuous map, may be the first value. A value of an area corresponding to the first interpolation non-applied object and the second interpolation non-applied object, of the discontinuous map, may be the second value.

According to an embodiment of the disclosure, the at least one instruction may, when executed, enable the electronic device 101 to, as at least part of identifying the discontinuous map corresponding to the first image frame and the second image frame, input image frames including the first image frame and the second image frame to an AI model configured to provide the discontinuous map. According to an embodiment of the disclosure, the at least one instruction may, when executed, enable the electronic device 101 to, as at least part of identifying the discontinuous map corresponding to the first image frame and the second image frame, identify the discontinuous map as a result output from the AI model. The number of the input image frames input to the AI model may be two or more.

According to an embodiment of the disclosure, the at least one instruction may, when executed, enable the electronic device 101 to identify whether to provide the interpolation image frame including the result of interpolation on the first interpolation-applied object and the second interpolation-applied object and the first interpolation non-applied object or the second interpolation non-applied object, based on whether at least one first parameter satisfies a first condition.

According to an embodiment of the disclosure, the at least one instruction may, when executed, enable the electronic device 101 to, as at least part of identifying whether to provide the interpolation image frame based on whether the first condition is satisfied, set at least one threshold constituting the first condition, based on at least one second parameter at least partially different from the at least one first parameter.

According to an embodiment of the disclosure, in a storage medium storing at least one computer-readable instruction, the at least one instruction may, when executed by the processor 120 of the electronic device 101, enable the electronic device 101 to perform at least one operation. The at least one operation may include obtaining a first image frame and a second image frame. The at least one operation may include identifying a first interpolation-applied object and a first interpolation non-applied object among objects included in the first image frame and identifying a second interpolation-applied object and a second interpolation non-applied object among objects included in the second image frame. Here, the first interpolation-applied object and the second interpolation-applied object may be objects having a gradually continuous movement in the first image frame and the second image frame. Here, the first interpolation non-applied object and the second interpolation non-applied object may be objects having no gradually continuous movement in the first image frame and the second image frame. The at least one operation may include providing an interpolation image frame including a result of interpolation on the first interpolation-applied object and the second interpolation-applied object and the first interpolation non-applied object or the second interpolation non-applied object.

According to an embodiment of the disclosure, the identifying the first interpolation-applied object and the first interpolation non-applied object and identifying the second interpolation-applied object and the second interpolation non-applied object may include, identifying a discontinuous map corresponding to the first image frame and the second image frame. The discontinuous map may include information for identifying the first interpolation-applied object, the first interpolation non-applied object, the second interpolation-applied object, and/or the second interpolation non-applied object.

According to an embodiment of the disclosure, the discontinuous map may include at least one area. Each of the at least one area may have a real number value between a first value and a second value. The at least one area may have the first value in case that the at least one area is an interpolation-applied object. The at least one area may have the second value in case that the at least one area is an interpolation non-applied object.

According to an embodiment of the disclosure, the providing the interpolation image frame may include determining a value of a first area of the interpolation image frame by a following equation. The equation may be D*Iref+(1−D)*Ic. In the equation, D may be the value of the first area of the discontinuous map, Iref may be the value of the first area of either the first image frame or the second image frame, and Ic may be the value of the first area of the result of interpolation on the first image frame and the second image frame.

According to an embodiment of the disclosure, a value of an area corresponding to the first interpolation-applied object and the second interpolation-applied object, of the discontinuous map, may be the first value. A value of an area corresponding to the first interpolation non-applied object and the second interpolation non-applied object, of the discontinuous map, may be the second value.

According to an embodiment of the disclosure, the discontinuous map may include at least one area. Each of the at least one area may have a first value or a second value. The at least one area may have the first value in case that the at least one area is an interpolation-applied object. The at least one area may have the second value in case that the at least one area is an interpolation non-applied object. A value of an area corresponding to the first interpolation-applied object and the second interpolation-applied object, of the discontinuous map, may be the first value. A value of an area corresponding to the first interpolation non-applied object and the second interpolation non-applied object, of the discontinuous map, may be the second value.

According to an embodiment of the disclosure, the identifying the discontinuous map corresponding to the first image frame and the second image frame may include inputting input image frames including the first image frame and the second image frame to an AI model configured to provide the discontinuous map. The identifying the discontinuous map corresponding to the first image frame and the second image frame may include identifying the discontinuous map as a result output from the AI model. The number of the input image frames input to the AI model may be two or more.

According to an embodiment of the disclosure, the at least one operation may further include identifying whether to provide the interpolation image frame including the result of interpolation on the first interpolation-applied object and the second interpolation-applied object and the first interpolation non-applied object or the second interpolation non-applied object, based on whether at least one first parameter satisfies a first condition.

According to an embodiment of the disclosure, identifying whether to provide the interpolation image frame based on whether the first condition is satisfied may set at least one threshold constituting the first condition, based on at least one second parameter at least partially different from the at least one first parameter.

According to an embodiment of the disclosure, a method for operating an electronic device 101 may include obtaining a first image frame and a second image frame. The method for operating the electronic device 101 may include identifying a first interpolation-applied object and a first interpolation non-applied object among objects included in the first image frame and identifying a second interpolation-applied object and a second interpolation non-applied object among objects included in the second image frame. Here, the first interpolation-applied object and the second interpolation-applied object may be objects having a gradually continuous movement in the first image frame and the second image frame. Here, the first interpolation non-applied object and the second interpolation non-applied object may be objects having no gradually continuous movement in the first image frame and the second image frame. The method for operating the electronic device 101 may include providing an interpolation image frame including a result of interpolation on the first interpolation-applied object and the second interpolation-applied object and the first interpolation non-applied object or the second interpolation non-applied object.

According to an embodiment of the disclosure, the identifying the first interpolation-applied object and the first interpolation non-applied object and identifying the second interpolation-applied object and the second interpolation non-applied object may include identifying a discontinuous map corresponding to the first image frame and the second image frame. The discontinuous map may include information for identifying the first interpolation-applied object, the first interpolation non-applied object, the second interpolation-applied object, and/or the second interpolation non-applied object.

According to an embodiment of the disclosure, the discontinuous map may include at least one area. Each of the at least one area may have a real number value between a first value and a second value. The at least one area may have the first value in case that the at least one area is an interpolation-applied object. The at least one area may have the second value in case that the at least one area is an interpolation non-applied object.

According to an embodiment of the disclosure, the providing the interpolation image frame may include determining a value of a first area of the interpolation image frame by a following equation. The equation may be D*Iref+(1−D)*Ic. In the equation, D may be the value of the first area of the discontinuous map, Iref may be the value of the first area of either the first image frame or the second image frame, and Ic may be the value of the first area of the result of interpolation on the first image frame and the second image frame.

According to an embodiment of the disclosure, a value of an area corresponding to the first interpolation-applied object and the second interpolation-applied object, of the discontinuous map, may be the first value. A value of an area corresponding to the first interpolation non-applied object and the second interpolation non-applied object, of the discontinuous map, may be the second value.

According to an embodiment of the disclosure, the discontinuous map may include at least one area. Each of the at least one area may have a first value or a second value. In case that the at least one area is an interpolation-applied object, the at least one area may have the first value. In case that the at least one area is an interpolation non-applied object, the at least one area may have the second value. A value of an area corresponding to the first interpolation-applied object and the second interpolation-applied object, of the discontinuous map, may be the first value. A value of an area corresponding to the first interpolation non-applied object and the second interpolation non-applied object, of the discontinuous map, may be the second value.

According to an embodiment of the disclosure, the identifying the discontinuous map corresponding to the first image frame and the second image frame may include inputting input image frames including the first image frame and the second image frame to an AI model configured to provide the discontinuous map. The identifying the discontinuous map corresponding to the first image frame and the second image frame may include identifying the discontinuous map as a result output from the AI model. The number of the input image frames input to the AI model may be two or more.

According to an embodiment of the disclosure, the at least one operation may further include identifying whether to provide the interpolation image frame including the result of interpolation on the first interpolation-applied object and the second interpolation-applied object and the first interpolation non-applied object or the second interpolation non-applied object, based on whether at least one first parameter satisfies a first condition.

According to an embodiment of the disclosure, the identifying whether to provide the interpolation image frame based on whether the first condition is satisfied may include setting at least one threshold constituting the first condition, based on at least one second parameter at least partially different from the at least one first parameter.

According to an embodiment of the disclosure, the electronic device 101 may comprise the processor 120 and the memory 130. The memory 130 may store at least one instruction that, when executed by the processor 120, enables the electronic device 101 to input a plurality of image frames to a first AI model (e.g., $F_D$) and obtain a discontinuous map as an output from the first AI model. The memory 130 may store at least one instruction that, when executed by the processor 120, enables the electronic device 101 to input a first image frame and a second image frame among the plurality of image frames to a second AI model (e.g., $F_C$) for interpolation and obtain an interpolation image frame as an output from the second AI model. The memory 130 may store at least one instruction that, when executed by the processor 120, enables the electronic device 101 to provide a final interpolation image frame for the first image frame and the second image frame, based on a weighted sum of the interpolation image frame, the discontinuous map, and a reference image frame selected among the first image frame and the second image frame.

According to an embodiment of the disclosure, the discontinuous map may include at least one area. Each of the at least one area may have a real number value between a first value and a second value. The at least one area may have the first value in case that the at least one area is an interpolation-applied object, and the at least one area may have the second value in case that the at least one area is an interpolation non-applied object. The at least one instruction, when executed, may enable the electronic device 101 to, as at least part of providing the interpolation image frame, determine a value of a first area of the interpolation image frame by a following equation. The equation may be D*Iref+(1–D)*Ic. In the equation, D may be the value of the first area of the discontinuous map, Iref may be the value of the first area of the reference image frame, and Ic may be the value of the first area of the interpolation image frame.

According to an embodiment of the disclosure, in a storage medium storing at least one computer-readable instruction, the at least one instruction may, when executed by the processor 120 of the electronic device 101, enable the electronic device 101 to perform at least one operation. The at least one operation may include inputting a plurality of image frames to a first AI model and obtaining a discontinuous map as an output from the first AI model. The at least one operation may include inputting a first image frame and a second image frame among the plurality of image frames to a second AI model for interpolation and obtaining an interpolation image frame as an output from the second AI model. The at least one operation may include providing a final interpolation image frame for the first image frame and the second image frame, based on a weighted sum of the interpolation image frame, the discontinuous map, and a reference image frame selected among the first image frame and the second image frame.

According to an embodiment of the disclosure, a method for operating an electronic device 101 may comprise inputting a plurality of image frames to a first AI model and obtaining a discontinuous map as an output from the first AI model. The method for operating the electronic device 101 may comprise inputting a first image frame and a second image frame among the plurality of image frames to a second AI model for interpolation and obtaining an interpolation image frame as an output from the second AI model. The method for operating the electronic device 101 may comprise providing a final interpolation image frame for the first image frame and the second image frame, based on a weighted sum of the interpolation image frame, the discontinuous map, and a reference image frame selected among the first image frame and the second image frame.

According to an embodiment of the disclosure, the discontinuous map may include at least one area. Each of the at least one area may have a real number value between a first value and a second value. In case that the at least one area is an interpolation-applied object, the at least one area may have the first value, and in case that the at least one area is an interpolation non-applied object, the at least one area may have the second value. The providing the interpolation image frame may include determining a value of a first area of the interpolation image frame by a following equation. The equation may be D*Iref+(1–D)*Ic. In the equation, D may be the value of the first area of the discontinuous map, Iref may be the value of the first area of the reference image frame, and Ic may be the value of the first area of the interpolation image frame.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one processor; and
a memory,
wherein the memory stores at least one instruction that, when executed by the at least one processor, enables the electronic device to:
obtain a first image frame and a second image frame,
identify a first interpolation-applied object and a first interpolation non-applied object among objects included in the first image frame, based on identifying a discontinuous map corresponding to the first image frame and the second image frame,
identify a second interpolation-applied object and a second interpolation non-applied object among objects included in the second image frame,
wherein the first interpolation-applied object and the second interpolation-applied object are objects having a gradually continuous movement in the first image frame and the second image frame, and
wherein the first interpolation non-applied object and the second interpolation non-applied object are objects having no gradually continuous movement in the first image frame and the second image frame, and
provide an interpolation image frame including a result of interpolation on the first interpolation-applied object and the second interpolation-applied object and the first interpolation non-applied object or the second interpolation non-applied object,
wherein the discontinuous map includes information for identifying the first interpolation-applied object, the first interpolation non-applied object, the second interpolation-applied object, or the second interpolation non-applied object.

2. The electronic device of claim 1,
wherein the discontinuous map includes at least one area,
wherein each of the at least one area has a real number value between a first value and a second value,
wherein the at least one area has the first value, in case that the at least one area is an interpolation-applied object,
wherein the at least one area has the second value, in case that the at least one area is an interpolation non-applied object, and
wherein the at least one area has a real number value larger than the first value and less than the second value, in case that the at least one area has a possibility of being an interpolation-applied object and a possibility of being an interpolation non-applied object.

3. The electronic device of claim 2,
wherein the at least one instruction, when executed, enables the electronic device to, as at least part of providing the interpolation image frame, determine a value of a first area of the interpolation image frame by a following equation, $$D*Iref+(1-D)*Ic, \text{ and}$$

wherein in the equation, D is the value of the first area of the discontinuous map, Iref is the value of the first area of either the first image frame or the second image frame, and Ic is the value of the first area of the result of interpolation on the first image frame and the second image frame.

4. The electronic device of claim 2, wherein a value of an area corresponding to the first interpolation-applied object and the second interpolation-applied object, of the discontinuous map, is the first value, and wherein a value of an area corresponding to the first interpolation non-applied object and the second interpolation non-applied object, of the discontinuous map, is the second value.

5. The electronic device of claim 4, wherein the discontinuous map includes at least one area, wherein each of the at least one area has a first value or a second value, wherein the at least one area has the first value, in case that the at least one area is an interpolation-applied object, wherein the at least one area has the second value, in case that the at least one area is an interpolation non-applied object, wherein a value of an area corresponding to the first interpolation-applied object and the second interpolation-applied object, of the discontinuous map, is the first value, and wherein a value of an area corresponding to the first interpolation non-applied object and the second interpolation non-applied object, of the discontinuous map, is the second value.

6. The electronic device of claim 5, wherein the at least one instruction, when executed, enables the electronic device to, as at least part of identifying the discontinuous map corresponding to the first image frame and the second image frame:

input image frames including the first image frame and the second image frame to an artificial intelligence (AI) model configured to provide the discontinuous map, and identify the discontinuous map as a result output from the AI model, and wherein a number of the input image frames input to the AI model is two or more.

7. The electronic device of claim 6, wherein the AI model is trained based on a plurality of training data, and wherein each of the plurality of training data is obtained based on loading image frames and mixing a figure or text to each of the image frames.

8. The electronic device of claim 7, wherein the AI model is trained based on inputting a first result of:

applying image frames included in training data to the AI model and a correct answer of the discontinuous map to a first loss function for the discontinuous map;

identifying a second result of applying an image frame pair including two adjacent image frames among the training data to an AI model for interpolation;

identifying a weighted sum of the first result, the second result, and a reference image frame of the image frame pair;

inputting the weighted sum and a correct answer of a final interpolation image frame to a second loss function; and adjusting at least one parameter of the AI model to reduce a sum of an output value of the first loss function and an output value of the second loss function.

9. The electronic device of claim 1, wherein the at least one instruction, when executed, enables the electronic device to:

identify, based on whether at least one first parameter satisfies a first condition, whether to provide the interpolation image frame including the result of interpolation on the first interpolation-applied object and the second interpolation-applied object, and the first interpolation non-applied object or the second interpolation non-applied object.

10. The electronic device of claim 9, wherein the at least one instruction, when executed, enables the electronic device to, as at least part of identifying whether to provide the interpolation image frame based on whether the first condition is satisfied:

set at least one threshold constituting the first condition, based on at least one second parameter at least partially different from the at least one first parameter.

11. A non-transitory storage medium storing at least one computer-readable instruction, the at least one computer-readable instruction, when executed by at least one processor of an electronic device, enabling the electronic device to perform at least one operation, the at least one operation comprising:

obtaining a first image frame and a second image frame;

identifying a first interpolation-applied object and a first interpolation non-applied object among objects included in the first image frame based on identifying a discontinuous map corresponding to the first image frame and the second image frame, and identifying a second interpolation-applied object and a second interpolation non-applied object among objects included in the second image frame, wherein the first interpolation-applied object and the second interpolation-applied object are objects having a gradually continuous movement in the first image frame and the second image frame, and wherein the first interpolation non-applied object and the second interpolation non-applied object are objects having no gradually continuous movement in the first image frame and the second image frame; and providing an interpolation image frame including a result of interpolation on the first interpolation-applied object and the second interpolation-applied object and the first interpolation non-applied object or the second interpolation non-applied object, wherein the discontinuous map includes information for identifying the first interpolation-applied object, the first interpolation non-applied object, the second interpolation-applied object, or the second interpolation non-applied object.

12. The non-transitory storage medium of claim 11, wherein the discontinuous map includes at least one area, wherein each of the at least one area has a real number value between a first value and a second value, wherein the at least one area has the first value, in case that the at least one area is an interpolation-applied object, wherein the at least one area has the second value, in case the at least one area is an interpolation non-applied object, and wherein the at least one area has a real number value larger than the first value and less than the second value, in case that the at least one area has a possibility of being an interpolation-applied object and a possibility of being an interpolation non-applied object.

13. The non-transitory storage medium of claim 12, wherein the providing the interpolation image frame includes, determining a value of a first area of the interpolation image frame by a following equation, $$D*Iref+(1-D)*Ic, \text{ and}$$

wherein in the equation, D is the value of the first area of the discontinuous map, Iref is the value of the first area of either the first image frame or the second image frame, and Ic is the value of the first area of the result of interpolation on the first image frame and the second image frame.

14. The non-transitory storage medium of claim 12, wherein a value of an area corresponding to the first interpolation-applied object and the second interpolation-applied object, of the discontinuous map, is the first value, and wherein a value of an area corresponding to the first interpolation non-applied object and the second interpolation non-applied object, of the discontinuous map, is the second value.

15. An electronic device comprising:

at least one processor; and a memory, wherein the memory stores at least one instruction that, when executed by the at least one processor, enables the electronic device to:

input a plurality of image frames to a first AI model and obtain a discontinuous map as an output from the first AI model, input a first image frame and a second image frame among the plurality of image frames to a second AI model for interpolation and obtain an interpolation image frame as an output from the second AI model, and provide a final interpolation image frame for the first image frame and the second image frame, based on a weighted sum of the interpolation image frame, the discontinuous map, and a reference image frame selected among the first image frame and the second image frame.

16. The electronic device of claim 15, wherein the discontinuous map includes at least one area, wherein each of the at least one area has a real number value between a first value and a second value, wherein the at least one area has the first value in case that the at least one area is an interpolation-applied object, and the at least one area has the second value in case that the at least one area is an interpolation non-applied object, wherein the at least one area has a real number value larger than the first value and less than the second value in case that the at least one area has a possibility of being an interpolation-applied object and a possibility of being an interpolation non-applied object, wherein the at least one instruction, when executed, enables the electronic device to, as at least part of providing the interpolation image frame, determine a value of a first area of the interpolation image frame by a following equation, $$D*Iref+(1-D)*Ic, \text{ and}$$

wherein in the equation, D is the value of the first area of the discontinuous map, Iref is the value of the first area of the reference image frame, and Ic is the value of the first area of the interpolation image frame.

17. The electronic device of claim 16, wherein the first AI model and the second AI model are trained based on a plurality of training data, and wherein each of the plurality of training data is obtained based on loading image frames and mixing a figure or text to each of the image frames.

18. The electronic device of claim 17, wherein the first AI model and the second AI model are trained based on inputting a first result of:

applying image frames included in training data to the first AI model and the second AI model and a correct answer of the discontinuous map to a first loss function for the discontinuous map;

identifying a second result of applying an image frame pair including two adjacent image frames among the training data to the first AI model and the second AI model for interpolation;

identifying a weighted sum of the first result, the second result, and a reference image frame of the image frame pair;

inputting the weighted sum and a correct answer of a final interpolation image frame to a second loss function; and adjusting at least one parameter of the first AI model and the second AI model to reduce a sum of an output value of the first loss function and an output value of the second loss function.

\* \* \* \* \*